(12) United States Patent
Long et al.

(10) Patent No.: US 9,940,304 B2
(45) Date of Patent: Apr. 10, 2018

(54) METHODS AND SYSTEMS FOR INSERTING CONTENT IN A MOBILE APPLICATION

(71) Applicant: Google Inc., Mountain View, CA (US)

(72) Inventors: Thomas James Worthington Long, London (GB); Anastasios Kakalis, London (GB)

(73) Assignee: Google LLC, Mountain View, CA (US)

( * ) Notice: Subject to any disclaimer, the term of this patent is extended or adjusted under 35 U.S.C. 154(b) by 148 days.

(21) Appl. No.: 14/609,186

(22) Filed: Jan. 29, 2015

(65) Prior Publication Data
US 2016/0127442 A1 May 5, 2016

(30) Foreign Application Priority Data

Nov. 5, 2014 (EP) .................................... 14386028

(51) Int. Cl.
| | | |
|---|---|---|
| *G06F 17/21* | (2006.01) | |
| *G06F 3/0483* | (2013.01) | |
| *H04L 29/06* | (2006.01) | |
| *H04L 29/08* | (2006.01) | |

(52) U.S. Cl.
CPC .......... *G06F 17/212* (2013.01); *G06F 3/0483* (2013.01); *H04L 65/602* (2013.01); *H04L 67/20* (2013.01)

(58) Field of Classification Search
None
See application file for complete search history.

(56) References Cited

U.S. PATENT DOCUMENTS

| | | |
|---|---|---|
| 8,230,016 B1 | 7/2012 | Pattan et al. |
| 8,532,916 B1 | 9/2013 | Szybalski |
| 9,043,750 B2 | 5/2015 | Hoffmann |
| 2004/0162760 A1* | 8/2004 | Seet ...................... G06F 3/0483 705/14.4 |
| 2007/0234327 A1 | 10/2007 | Baxter et al. |
| 2010/0125491 A1 | 5/2010 | Elliott et al. |

(Continued)

OTHER PUBLICATIONS

Amazon Mobile Ads API Increases Monetization Opportunities with Expansion into Europe and New Interstitial Ad Format, via online at https://developer.amazon.com/public/community/post/Tx25S4QUW19A75J/Amazon-Mobile-Ads-API-Increases-Monetization-Opportunities-with-Expansion-into-E, searched on Jan. 14, 2015.

(Continued)

*Primary Examiner* — Kevin Bates
*Assistant Examiner* — Lesa Kennedy
(74) *Attorney, Agent, or Firm* — Foley & Lardner LLP

(57) ABSTRACT

Systems and methods for automatically providing third-party content for display in a mobile application based on an interaction with the mobile application are described. One or more processors identify a mobile application within which to insert content. The processors receive one or more actions performed on a mobile application executing on a computing device. The processors determine that the one or more actions performed on a mobile application correspond to a content insertion policy for inserting content to the mobile application. The processor then transmits, to the mobile application, content for display within the mobile application executing on the computing device responsive to determining that the one or more actions performed on the mobile application correspond to the content insertion policy.

20 Claims, 8 Drawing Sheets

(56) References Cited

U.S. PATENT DOCUMENTS

| | | | |
|---|---|---|---|
| 2011/0238496 A1* | 9/2011 | Gurbuxani | G06Q 30/02 705/14.49 |
| 2011/0258249 A1 | 10/2011 | Biggs et al. | |
| 2011/0288913 A1 | 11/2011 | Waylonis et al. | |
| 2011/0307323 A1* | 12/2011 | Kuhn | G06Q 10/00 705/14.42 |
| 2012/0066035 A1 | 3/2012 | Stanger et al. | |
| 2012/0166281 A1 | 6/2012 | Sartipi | |
| 2012/0253939 A1* | 10/2012 | Grigoriev | G06Q 30/0251 705/14.61 |
| 2013/0337838 A1 | 12/2013 | Kolodziej | |
| 2014/0304071 A1* | 10/2014 | Manafy | G06Q 30/0255 705/14.53 |

OTHER PUBLICATIONS

Stack Overflow: Add Admob Interstitial Ads to Existing App with Admob Banner Ads Only, via online at http://stackoverflow.com/questions/19380208/add-admob-interstitial-ads-to-existing-app-with-admob-banner-ads-only, searched on Jan. 14, 2015.
Vserv: Mobile App Monetization for Developers, via internet at http://www.vserv.mobi/mobile-app-monetization-for-developers/, searched on Jan. 14, 2015.
U.S. Office Action on U.S. Appl. No. 14/609,205 dated Jun. 2, 2017.

\* cited by examiner

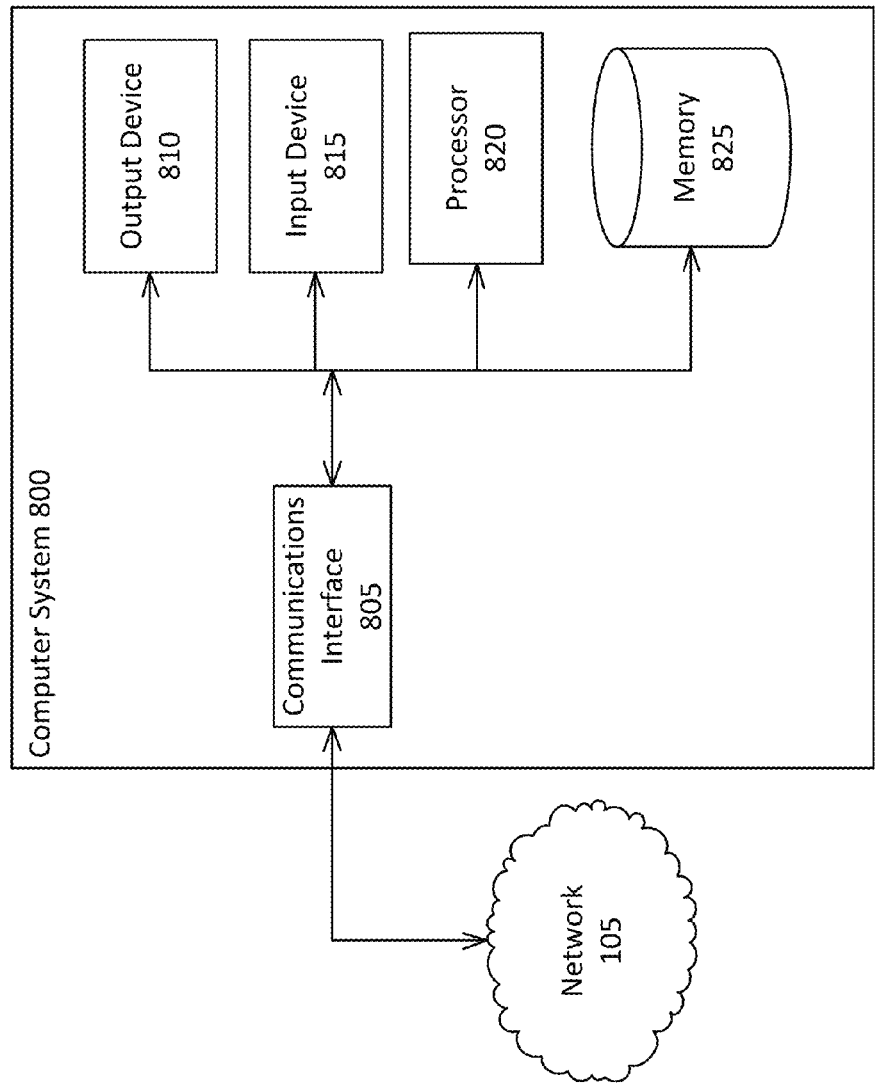

METHODS AND SYSTEMS FOR INSERTING CONTENT IN A MOBILE APPLICATION

RELATED APPLICATIONS

This application claims the benefit of and priority to EP Application No. 14386028.6, entitled "METHODS AND SYSTEMS FOR IDENTIFYING ELEMENTS OF A MOBILE APPLICATION," and filed on Nov. 5, 2014, the disclosure of which is incorporated herein by reference in its entirety.

BACKGROUND

A mobile application can include a plurality of views within which primary content is displayed. In some implementations, a mobile application can include one or more content slots that serve as placeholders for third-party content items, such as creatives. In this way, the mobile application can provide, for display, both primary content as well as third-party content items while the mobile application is executing on a computing device.

SUMMARY

At least one aspect is directed to a method for identifying elements of a mobile application. One or more processors can receive a request to identify elements of a mobile application. The processors can map a plurality of views included in the mobile application and associated transitions between the plurality of views. For each of the plurality of views, the processors can determine a category of the view. The processors can then store, for the mobile application, a data structure identifying each of the plurality of views, and for each of the plurality of views, the category of the view, and one more transitions to others of the plurality of views for use in responding to a request for content from the mobile application.

In some implementations, to map the plurality of views included in the mobile application and associated transitions between the plurality of views, the processors determine, for at least a first view, one or more actions associated with the first view and identify, for at least one action of the actions associated with the first view, a subsequent view to which the mobile application transitions responsive to the identified action associated with the first view.

In some implementations, to map the plurality of views included in the mobile application and associated transitions between the plurality of views, the processors assigning, the at least one action, an action identifier and wherein storing, for the mobile application, the data structure includes storing the assigned action identifier.

In some implementations, to map the plurality of views included in the mobile application and associated transitions between the plurality of views, the processors can identify a first action associated with a first view of the plurality of views. The processors can identify a second view of the plurality of views to which the mobile application transitions responsive to the first action on the first view. The processors can then identify a second action associated with the first view. The processors can then identify a third view of the plurality of views to which the mobile application transitions responsive to the second action on the first view.

In some implementations, to determine, for each of the plurality of views, a category of the view, the processor can determine, for each of the plurality of views, a category of the view based on an arrangement of one or more visual objects included in the view.

In some implementations, to determine, for each of the plurality of views, a category of the view, the processors can determine, for each of the plurality of views, a category of the view based on content included in the view. In some implementations, to determine, for each of the plurality of views, a category of the view, the processor determines, for each of the plurality of views, a category of the view based on information associated with the view that is provided by a mobile application developer.

In some implementations, the processors can identify, for each of the plurality of views, a view hierarchy corresponding to an arrangement of one or more objects included in the view. In some implementations, the processors can identify, from the view hierarchy, a subset of the objects as a stable portion of the view hierarchy. The processors can determine, for each of the plurality of views, a category of the views based on the stable portion of the view hierarchy. In some implementations, the objects may be visual objects. In some implementations, the objects may be non-visual objects. In some implementations, the objects can be any object that can be detected programmatically.

According to another aspect, a system for identifying elements of a mobile application is described. The system includes a memory and one or more processors. The one or more processors can be configured to receive a request to identify elements of a mobile application. The processors can be configured to map a plurality of views included in the mobile application and associated transitions between the plurality of views. For each of the plurality of views, the processors can be configured to determine a category of the view. The processors can be configured to then store, for the mobile application, a data structure identifying each of the plurality of views, and for each of the plurality of views, the category of the view, and one more transitions to others of the plurality of views for use in responding to a request for content from the mobile application.

According to another aspect, a computer-readable storage medium has computer-executable instructions, which when executed by a computer, cause the computer to receive a request to identify elements of a mobile application, map a plurality of views included in the mobile application and associated transitions between the plurality of views, determine a category of the view for each of the plurality of views and then store, for the mobile application, a data structure identifying each of the plurality of views, and for each of the plurality of views, the category of the view, and one more transitions to others of the plurality of views for use in responding to a request for content from the mobile application.

Another aspect is directed to a method for automatically providing third-party content for display in a mobile application based on an interaction with the mobile application. One or more processors identify a mobile application within which to insert content. The processors receive one or more actions performed on a mobile application executing on a computing device. The processors determine that the one or more actions performed on a mobile application correspond to a content insertion policy for inserting content to the mobile application. The processor then transmits, to the mobile application, content for display within the mobile application executing on the computing device responsive to determining that the one or more actions performed on the mobile application correspond to the content insertion policy.

In some implementations, the processors can identify a context associated with each of the actions. The context identifies a category of the view of the mobile application on which the action was performed and a type of action.

In some implementations, the processors identify a data structure of a mobile application. The data structure identifies a plurality of views, a category of each of the plurality of views, and one more transitions to others of the plurality of views for use in responding to a request for content from the mobile application.

In some implementations, the processors provide, for display, the third-party content in a view of the mobile application that is between a transition from a first view and a second view.

In some implementations, the processors identify, for the mobile application, the content insertion policy associated with the mobile application. The processors determine, from the content insertion policy, one or more content insertion parameters that correspond to inserting third-party content. The processors can receive a sequence of actions from the mobile application. The processors can then determine that the sequence of actions matches one of the one or more content insertion parameters.

In some implementations, the processors can generate the content insertion policy and associate the content insertion policy to the mobile application. In some implementations, generating the content insertion policy includes identifying, for the mobile application, one or more goals, determining, from historical usage of the mobile application across a plurality of computing devices, one or more sequences of actions performed on the mobile application more than a threshold number of times and creating a rule to insert content after determining that any of the one or more determined sequences of actions is performed on the mobile application.

In some implementations, the processors determine a performance of the mobile application across a plurality of computing devices. The processors determine that the performance of the mobile application is below a threshold performance level. The processors then modify the content insertion policy to include additional content insertion opportunities.

In some implementations, the processors can receive an indication that the mobile application is launched on a computing device. The processors generate a session responsive to receiving an indication that the mobile application is launched. The processors receive a sequence of actions performed on the mobile application in response to an action performed on the mobile application. The processors identify from the sequence of actions performed on the mobile application, one or more subsets of actions. The processors determine that none of the one or more subsets of actions matches a sequence of actions identified in the content insertion policy. The processors then determine to not insert content in response to determining that none of the one or more subsets of actions matches a sequence of actions identified in the content insertion policy.

According to another aspect, a system for automatically providing third-party content for display in a mobile application based on an interaction with the mobile application is described. The system includes a memory and one or more processors. The one or more processors can be configured to identify a mobile application within which to insert content. The processors can be configured to receive one or more actions performed on a mobile application executing on a computing device. The processors can be configured to determine that the one or more actions performed on a mobile application correspond to a content insertion policy for inserting content to the mobile application. The processors can be configured to then transmit, to the mobile application, content for display within the mobile application executing on the computing device responsive to determining that the one or more actions performed on the mobile application correspond to the content insertion policy.

According to another aspect, a computer-readable storage medium has computer-executable instructions, which when executed by a computer, cause the computer to identify a mobile application within which to insert content, receive one or more actions performed on a mobile application executing on a computing device, determine that the one or more actions performed on a mobile application correspond to a content insertion policy for inserting content to the mobile application and transmit, to the mobile application, content for display within the mobile application executing on the computing device responsive to determining that the one or more actions performed on the mobile application correspond to the content insertion policy.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 8 is a block diagram illustrating an implementation of a general architecture for a computer system that may be employed to implement various elements of the systems and methods described and illustrated herein.

DETAILED DESCRIPTION

Figure 1:
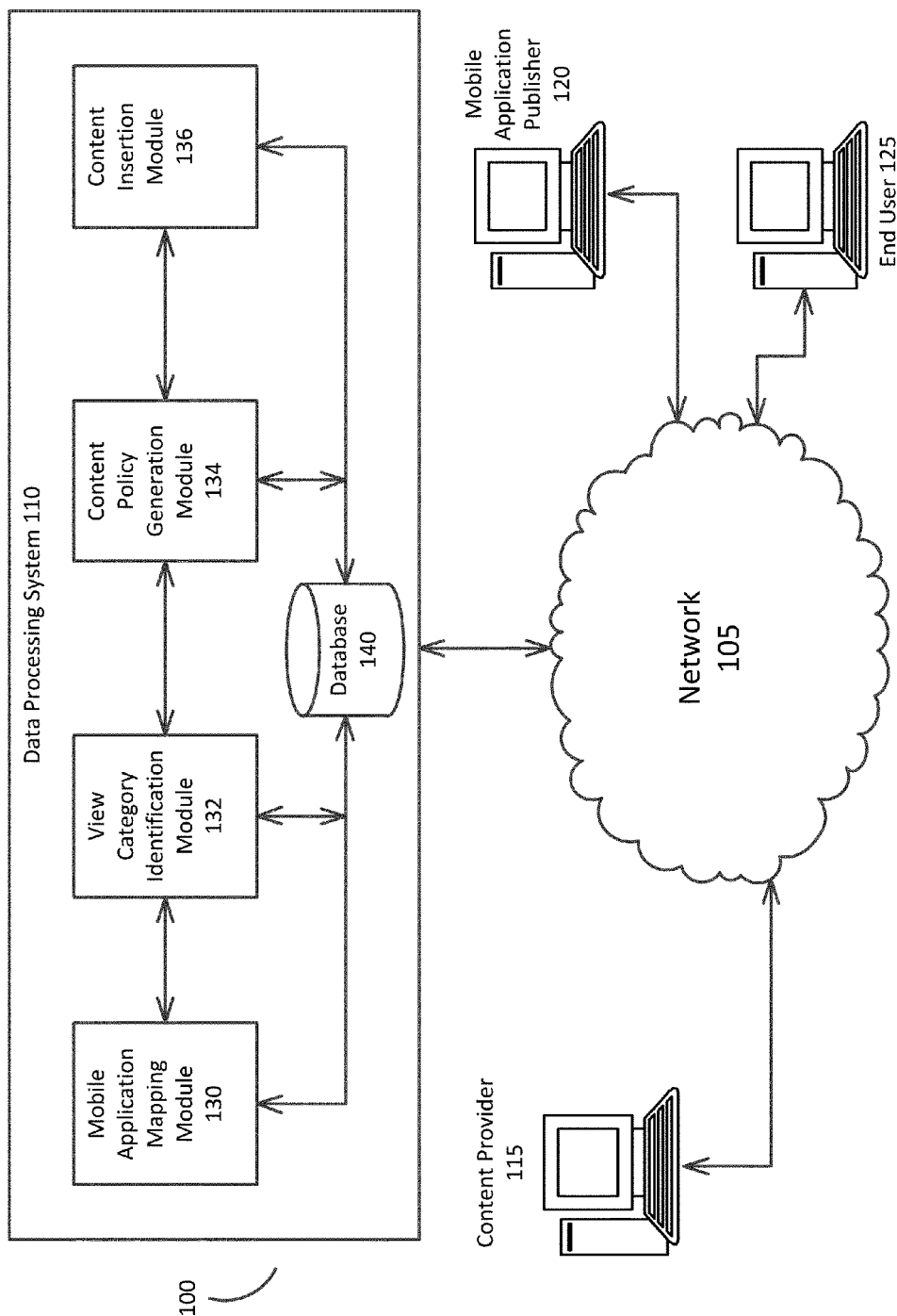
FIG. 1 is a block diagram depicting one implementation of an environment for identifying elements of a mobile application and automatically providing third-party content for display in a mobile application based on an interaction with the mobile application, according to an illustrative implementation.

Following below are more detailed descriptions of various concepts related to, and implementations of, methods, apparatus, and systems for identifying elements of a software application running on a portable computing device. For purposes of brevity, a software application is sometimes referred to herein simply as an "application" or an "app." Additionally, in the context of a portable user device, a software application designed specifically for such a device is sometimes referred to herein as a "mobile application" or "mobile app," also for purposes of brevity.

One aspect of the present disclosure provides detailed descriptions of various concepts related to, and implementations of, methods, systems and apparatus for identifying elements of a mobile application. One or more processors can receive a request to identify elements of a mobile application. The processors can map a plurality of views included in the mobile application and associated transitions between the plurality of views. For each of the plurality of views, the processors can determine a category of the view. The processors can then store, for the mobile application, a data structure identifying each of the plurality of views, and for each of the plurality of views, the category of the view, and one more transitions to others of the plurality of views for use in responding to a request for content from the mobile application.

Another aspect of the present disclosure provides detailed descriptions of various concepts related to, and implementations of, methods, systems and apparatus for automatically providing third-party content for display in a mobile application based on an interaction with the mobile application. One or more processors identify a mobile application within which to insert content. The processors receive one or more actions performed on a mobile application executing on a computing device. The processors determine that the one or more actions performed on a mobile application correspond to a content insertion policy for inserting content within the mobile application. The processor then transmits, to the mobile application, content for display within the mobile application responsive to determining that the one or more actions performed on the mobile application correspond to the content insertion policy. In some implementations, the content insertion policy can include one or more rules according to which to insert content. In some implementations, the rules can be based on a navigation path taken by a user interacting with the mobile application. The navigation path can include one or more actions or events that may be performed or that occur during a user session.

The various concepts introduced above and discussed in greater detail below may be implemented in any of numerous ways, as the described concepts are not limited to any particular manner of implementation. Examples of specific implementations and applications are provided primarily for illustrative purposes.

Generally, a mobile application can include any application that is executable on a mobile computing device, such as a phone, tablet, phablet, laptop, among others. It should be appreciated that the present disclosure is not limited to mobile applications executing on mobile computing devices, but instead, includes applications executable on other types of computing devices, including desktops, all in one computing devices, among others.

For mobile application developers and publishers, inserting third-party content, for example, a creative, into a mobile application can be tricky and time consuming. Generally, specific code has to be written into the mobile application to insert a creative and to show the creative at an appropriate time. Changing the creative or the position or location at which to insert the creative may often require a new version of the mobile application to be built and released. By way of the present disclosure, processors can identify elements within a mobile application and content can be inserted within the mobile application based on the identified elements without requiring a new version of the mobile application to be built and released.

FIG. 1 is a block diagram depicting one implementation of an environment for identifying elements of a mobile application and automatically providing third-party content for display within a mobile application based on an interaction with the mobile application. In particular, FIG. 1 illustrates a system 100 for identifying elements of a mobile application and automatically providing third-party content for display within a mobile application based on an interaction with the mobile application. In some implementations, the system 100 can facilitate the delivery of content between one or more computing devices via a network 105. The network 105 can include computer networks such as the internet, local, wide, metro or other area networks, intranets, satellite networks, other computer networks such as voice or data mobile phone communication networks, and combinations thereof. The system 100 can also include at least one data processing system 110, e.g., at least one logic device such as a computing device or server having one or more processors to communicate via the network 105, for instance with at least one content provider computing device 115, at least one content publisher computing device 120, or at least one end user computing device 125.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one mobile application mapping module 130, at least one view category identification module 132, at least one content policy generation module 134, at least one content insertion module 136 and at least one database 140. The mobile application mapping module 130, the view category identification module 132, the content policy generation module 134, and the content insertion module 136 can each include at least one processing unit, server, virtual server, circuit, engine, agent, appliance, or other logic device such as programmable logic arrays configured to communicate with the database 140 and with other computing devices (e.g., the content provider computing device 115, the content publisher computing device 120, or the end user computing device 125) via the network 105.

The mobile application mapping module 130, the view category identification module 132, the content policy generation module 134, and the content insertion module 136 can include or execute at least one computer program or at least one script. The mobile application mapping module 130, the view category identification module 132, the content policy generation module 134, and the content insertion module 136 can be separate components, a single component, or part of the data processing system 110. The mobile application mapping module 130, the view category identification module 132, the content policy generation module 134, and the content insertion module 136 can include combinations of software and hardware, such as one or more processors configured to execute one or more scripts to receive a request to identify elements of a mobile application, map a plurality of views included in the mobile application and associated transitions between the plurality of views, determine a category of the view and store, for the mobile application, a data structure identifying each of the plurality of views, and for each of the plurality of views, the category of the view, and one more transitions to others of the plurality of views for use in responding to a request for content from the mobile application, for instance.

Moreover, the mobile application mapping module 130, the view category identification module 132, the content policy generation module 134, and the content insertion module 136 can include combinations of software and hardware, such as one or more processors configured to execute one or more scripts to receive one or more actions performed on a mobile application executing on a computing device, determine that the one or more actions performed on a mobile application correspond to a content insertion policy for inserting content to the mobile application, and transmit, to the mobile application, content for display within the mobile application executing on the computing device responsive to determining that the one or more actions performed on the mobile application correspond to the content insertion policy, for instance.

The content provider computing devices 115 can include servers or other computing devices operated by a content provider entity to provide content items such as creatives or advertisements for display on information resources at the end user computing device 125. The content provided by the content provider computing device 115 can include third party content items or creatives (e.g., ads) for display on information resources such as a mobile application, a web application, a website, web page or any other information resource that includes primary content, e.g. content provided by the content publisher computing device 120. The content items can also be displayed in a view of a mobile application or as an interstitial ad provided for display when transitioning between a first view and a second view of a mobile application. In some implementations, the content items can be displayed within a content slot inserted in a view of the mobile application. In some implementations, the content items can be displayed within a web page or other information resource. In some implementations, the content items can be displayed within a browser of a mobile computing device. In some implementations, the content provider computing device 115 can provide or be the source of ads or other content items for display in content slots of information resources, such as a web page of a company where the primary content of the web page is provided by the company, or for display on a search results landing page provided by a search engine. As described above, the content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. In some implementations, the content publisher computing device 120 can be associated with a mobile application developer or publisher that provides primary content for display within a mobile application. In some implementations, the content publisher computing device 120 can be associated with a mobile application developer or publisher that creates a mobile application and is capable of sending updates to the mobile application. In some implementations, the content publisher computing device 120 can be associated with a mobile application developer or publisher that is capable of providing content to an end user computing device 125 via the mobile application that is configured to execute on the end user computing device 125. In some implementations, the content publisher computing device 120 can include a web page operator who provides primary content for display on the web page. The primary content can include content other than that provided by the content publisher computing device 120, and the information resource can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115.

The end user computing devices 125 can include computing devices configured to communicate via the network 105 to display data such as the content provided by the content publisher computing device 120 (e.g., mobile application views, primary web page content or other information resources) and the content provided by the content provider computing device 115 (e.g., third party content items such as ads configured for display within a mobile application). The end user computing device 125, the content provider computing device 115, and the content publisher computing device 120 can include desktop computers, laptop computers, tablet computers, smartphones, personal digital assistants, mobile devices (such as smartphones, phablets, tablets, among others), consumer computing devices, servers, clients, and other computing devices. The end user computing device 125, the content provider computing device 115, and the content publisher computing device 120 can include user interfaces such as microphones, speakers, touchscreens, keyboards, pointing devices, a computer mouse, touchpad, or other input or output interfaces.

The content provider computing devices 115, the content publisher computing device 120 and the end user computing devices 125 may be any number of different user electronic devices, for example, a laptop computer, a desktop computer, a tablet computer, a smartphone, a digital video recorder, a set-top box for a television, a video game console, or any other computing device configured to communicate via the network 105. The content provider computing devices 115, the content publisher computing device 120 and the end user computing devices 125 can include one or more processors and a memory, i.e., a processing circuit. The memory stores machine instructions that, when executed by processor, cause the processors to perform one or more of the operations described herein. The processors may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language such as, but not limited to, C, C++, C#, Java, JavaScript, Perl, Python and Visual Basic.

The content provider computing devices 115, the content publisher computing device 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or advertiser can communicate with the data processing system 110 via the content provider computing device 115. In some implementations, the advertiser can communicate with the data processing system 110 via a user interface displayed on the user interface devices of the content provider computing device 115.

The mobile application mapping module 130 can be part of, or can include scripts executed by, one or more servers in the data processing system 110. In some implementations, the mobile application mapping module 130 can be designed, constructed or configured to receive a request to identify elements of a mobile application. In some implementations, the request can be received from a mobile application developer or publisher. In some implementations, the request can include the mobile application associated with the request to identify elements. In some implementations, the request can identify the mobile application for which to identify elements.

In some implementations, the mobile application mapping module 130 may generate a data structure including a profile for the mobile application responsive to receiving the request. The profile can include an identifier identifying the mobile application, the identity of the developer and/or publisher of the mobile application, a type of mobile application (news, sports, content aggregator, a game, among others), an operating platform on which the mobile application operates, among others. The data structure can be stored in a database, or other content repository. Additional details regarding the data structure are provided below.

In some implementations, the mobile application mapping module 130 can be configured to identify elements within each view of the mobile application. In some implementations, an element of a mobile application can include any type of object, including but not limited to visible objects, non-visible objects, for example, code or other structures. In some implementations, the element can be any object capable of being identified by the mobile application mapping module 130. In some implementations, the elements can be visible objects that are displayed within a view of the mobile application.

In some implementations, the mobile application mapping module 130 can identify elements within a view in various ways. In some implementations, the mobile application mapping module 130 can identify elements within a view by visually analyzing the view to identify visual objects, such as icons, buttons, among others. The mobile application mapping module 130 can identify edges of a visual object to identify the boundary of an element.

In some implementations, the mobile application mapping module 130 can identify elements by crawling the view of the mobile application. In some implementations, to crawl the view of the mobile application, the mobile application mapping module 130 can perform one or more actions on pixels of the view. In some implementations, the mobile application mapping module 130 can perform a set of one or more actions on each pixel of the view and identify clusters of pixels that generate the same response to a particular set of actions. Each cluster of pixels can then be identified as an element.

In some implementations, the mobile application mapping module 130 can inspect a code associated with the view of the mobile application to identify one or more elements. In some implementations, the mobile application mapping module 130 can identify tags, objects, or other identifiers that may indicate that a particular portion of the code corresponds to an element. In some implementations, an element can be an icon, a link, or any other set of pixels that can be represented as an element based on how the pixels respond to a particular action.

The mobile application mapping module 130 can be configured to assign an identifier to each of the elements identified in one or more of the views of the mobile application. In some implementations, the identifier may identify the element as well as the view in which the element is included. In some implementations, the identifier can also identify the type of element. In some implementations, the mobile application mapping module 130 can determine the type of element based on visual characteristics of the element. For example, the mobile application mapping module 130 may determine that an element is a button based on the shape and text appearing on the element. In some implementations, the mobile application mapping module 130 may determine the type of element based on one or more triggering actions that can be performed on the element. For example, the element can be a button if the triggering action corresponds to a single tap. In some implementations, the mobile application mapping module 130 may determine the type of element by parsing the code of the mobile application.

The mobile application mapping module 130 can be configured to identify a plurality of views of the mobile application. In some implementations, the mobile application mapping module 130 can execute the mobile application in a simulator or emulator. The mobile application mapping module 130 can identify a first view of the mobile application. In some implementations, the mobile application mapping module 130 can identify a first view of the mobile application by launching the mobile application in the simulator or emulator. In some implementations, the mobile application mapping module 130 can then execute one or more actions on one or more elements or portions of the first view. One or more of these actions may cause the mobile application to transition from the first view to one or more other views. The mobile application mapping module 130 can identify, for each action that causes the mobile application to transition from the first view to one of the other views, the type of action and the element or portion of the view on which the action was performed. The mobile application mapping module 130 can also identify the view to which the mobile application transitions responsive to the action. In this way, the mobile application mapping module 130 may discover one or more views of the mobile application and transitions associated with each of the views.

In some implementations, the mobile application mapping module 130 can identify elements for each of the views to which the mobile application transitions and execute one or more actions on the elements of these views to identify additional views. Once all of the views to which the mobile application can transition have been analyzed to identify elements and actions performed on the elements and no other views are identified through transitions, the mobile application mapping module 130 may determine that all of the views of the mobile application have been identified. It should be appreciated that identifying views of the mobile application by identifying elements and executing actions on these elements may result in identifying fewer views than the actual number of views contained in the mobile application. This is because there may be some elements that remain unidentified and some actions that were not performed, which if performed, would result in transitions to additional views.

In some implementations, the mobile application mapping module 130 can identify, for each view, one or more other views to which the mobile application can transition responsive to one or more actions being performed on the view. In some implementations, the mobile application mapping module 130 can identify the plurality of views by inspecting the code of the mobile application and parsing through the code to identify identifiers associated with views of the mobile application. In some implementations, the mobile application mapping module 130 may receive additional information from the mobile application developer or publisher to identify one or more identifiers identifying the views. In some implementations, the mobile application mapping module 130 can identify all of the plurality of views from information received by the mobile application developer or publisher.

In some implementations, the mobile application mapping module 130 can assign an identifier to each of the identified views. In some implementations, the mobile application mapping module 130 can be configured to generate a data structure to store information about each view. In some implementations, the mobile application mapping module 130 can use the assigned identifier to update information about the view associated with the assigned identifier. In some implementations, the mobile application mapping module 130 can generate an identifier based on the category of the view. Details on how the mobile application mapping module 130 can determine the category of a view is described below.

In some implementations, the mobile application mapping module 130 can also identify, for each view of the plurality of views of the mobile application, one or more actions that cause the view to transition to another view of the plurality of views of the mobile application. Such actions may be referred to herein as triggering actions because these actions trigger a transition from one view to another view of the mobile application. The element on which the triggering action is performed may be referred to as a triggering element. In some instances, a triggering action may be associated with an element. However, in some instances, a triggering action may not be associated with a particular element, but rather is associated with the view itself.

In some implementations, the mobile application mapping module 130 may create, store or maintain a data structure that includes a plurality of candidate actions that can be performed on one or more views. In some implementations, these candidate actions can include actions used as triggering actions in one or more mobile applications. Examples of candidate actions can include swipes in one or more directions (left-to-right, right-to-left, top-to-bottom, bottom-to-top), a double tap, a long tap, a short tap, an outward pinch, an inward pinch, among others. Other examples of candidate actions can include actions performed on one or more dedicated input buttons of the computing device. In some implementations, the mobile application mapping module 130 can update the data structure to include additional candidate actions that the mobile application mapping module identifies as triggering action while performing methods to identify elements of a mobile application. In some implementations, the mobile application mapping module 130 can utilize the data structure including the plurality of actions across multiple mobile applications.

In some implementations, the mobile application mapping module 130 may be configured to identify one or more triggering actions for each view. The mobile application mapping module 130 may be configured to perform one or more of the candidate actions included in the data structure on the view. For each action performed, the mobile application mapping module 130 may then determine whether the mobile application transitions from the view to another view. If the mobile application mapping module 130 determines that a transition occurred, the mobile application mapping module 130 identifies the action performed as a triggering action for the view. In this way, the mobile application mapping module 130 can identify triggering actions for each view.

The mobile application mapping module 130 may be configured to perform one or more of the candidate actions included in the data structure on the view by executing a script capable of performing these actions. In some implementations, the actions do not need to actually be performed. Rather, the mobile application mapping module 130 may be configured to generate code or execute instructions that emulate one or more of these actions.

In some implementations, the mobile application mapping module 130 may be configured to identify one or more triggering actions for each view by parsing the code of the mobile application. In some implementations, the mobile application mapping module 130 may be configured to identify one or more triggering actions for each view from information received from the mobile application developer or publisher.

In some implementations, the mobile application mapping module 130 can identify, for each element identified in the view, one or more triggering actions that cause the mobile application to transition from the view to another view of the mobile application. The mobile application mapping module 130 can be configured to perform one or more of the candidate actions to identify which of the candidate actions are triggering actions for each of the elements identified in the view. It should be appreciated that different triggering actions performed on the same element can cause the mobile application to transition from the view to other views that are different from one another. In some implementations the mobile application mapping module 130 can identify a first triggering action associated with a first view of the plurality of views and identify a second view of the plurality of views to which the mobile application transitions in response to the first action on the first view. The mobile application mapping module 130 can then identify a second triggering action performed on the first view and identify a third view of the plurality of views to which the mobile application transitions in response to the second triggering action on the first view.

In some implementations, the mobile application mapping module 130 can identify, for each triggering action, the view of the mobile application to which the mobile application transitions to from the view on which the action was performed. The mobile application mapping module 130 can then store, in a data structure, for the mobile application, one or more of the identity of the mobile application, the identity of one or more views of the mobile application, the identity of one or more elements included in the views, the triggering actions associated with each of the views and if applicable, the identity of the elements of the views on which the triggering actions were performed.

In some implementations, the mobile application mapping module 130 can assign an identifier uniquely identifying each of the identified triggering actions. In some implementations, the identifier can be generated based on information relating to the type of triggering action, the element associated with the triggering action, the view on which the triggering action was performed, the view to which the mobile application transitioned in response to performing the triggering action, among others.

The view category identification module 132 can be part of, or can include scripts executed by, one or more servers in the data processing system 110. In some implementations, the view category identification module 132 can be designed, constructed or configured to determine, for one or more views, a view category of the view. In some implementations, the view category identification module 132 can determine a view category of a view based on a view identifier identifying the view. In some implementations, the view identifier can be provided by the mobile application developer and/or publisher. In some implementations, the view category identification module 132 can determine a view category of a view by inspecting a layout of the view. In some implementations, the layout can correspond to an arrangement of one or more objects of the view. In some implementations, the layout can correspond to an arrangement of one or more visual objects of the view. In some implementations, the view category identification module 132 can determine a view category of a view by analyzing the content included in the view. In some implementations, the view category identification module 132 can identify content items as primary content items provided by the mobile application developer and/or publisher and determine the view category from the primary content items.

In some implementations, the view category identification module 132 can identify a view hierarchy of a view for one or more of the plurality of views of the mobile application. The view hierarchy of a view can correspond to an arrangement of one or more elements included in the view. In some implementations, the view hierarchy can correspond to an arrangement of one or more visible objects included in the view. The view category identification module 132 can identify a view hierarchy by identifying, either from the code of the mobile application or visually, a layout of the elements of the view. The view hierarchy can be based on the position of the element relative to other elements in the view.

In some implementations, the view category identification module 132 can identify, from the view hierarchy, a subset of the objects as a stable portion of the view hierarchy. The view category identification module 132 can determine, for each of the plurality of views, a category of the views based on the stable portion of the view hierarchy. In some implementations, the objects may be visual objects. In some implementations, the objects may be non-visual objects. In some implementations, the objects can be any object that can be detected programmatically. The view category identification module 132 may determine that a subset of the objects is a stable portion of the view hierarchy based on comparing the view hierarchies of a plurality of views of the mobile application. In some implementations, the view category identification module 132 may identify an arrangement of a plurality of elements as a stable portion of the mobile application by determining that more than one of the views includes the same arrangement of a plurality of elements. In some implementations, the view category identification module 132 may identify an arrangement of a plurality of elements as a stable portion of the mobile application by first identifying an arrangement of a plurality of elements of a view, determining, for each of the plurality of elements, the type of element and then determining that more than one of the views includes the same arrangement of elements based on the type of elements. In this way, if more than one view includes a plurality of elements including an image, a title and a text portion arranged in a particular manner, the view category identification module 132 may identify the arrangement of the image, the title and the text portion as a stable portion of the view and associate all views including the arrangement of the image, the title and the text portion as corresponding to the same view category. A stable portion of the view may correspond to a format of the view or a template of the view. In some implementations, different views having the same format or template or arrangement of element types may belong to the same view category even though the actual content of the views are different from one another.

One example of a view category can include a home view that corresponds to the view provided for display when an active session of the mobile application does not exist and the mobile application is launched. Another example of a view category includes a content view category in which the view includes a plurality of elements representing different content items, each of them configured to cause the mobile application to transition from the view to another view that includes content related to the corresponding content item. Another example of a view category can be a settings view that includes elements related to settings for the mobile application. In some implementations, one or more view categories may include a settings element, upon which an action may be taken. Once an action is taken on the settings element, the mobile application transitions from the view on which the settings element is shown to the settings view. In some implementations, one or more other types of view categories may exist.

The view category identification module 132 can further be configured to generate one or more view categories. In some implementations, the view category identification module can generate a view category by inspecting the layout of elements of the view. In some implementations, the view category identification module can generate a view category based on the content included in the view. The view category identification module 132 can compare a view to existing view categories and upon determining that a view does not match one of the existing view categories, the view category identification module 132 can generate a new view category corresponding to the view.

For example, the view category identification module can generate an 'article' view category if the view category identification module 132 determines that the content included in the view is an article. In some implementations, the view category identification module can determine that the content included in the view is an article by inspecting the code of the view and determining that the code has one or more elements arranged in a particular manner. For example, the view category identification module 132 may determine that the view has a title element, an image element and one or more paragraphs of text blocks. The view category identification module may heuristically identify a view having the title element, the image element and paragraphs of text blocks as being a view that includes an article. In another example, the view category identification module 132 may determine that a view has a plurality of thumbnail image elements and title elements positioned immediately below the thumbnail image elements. The view category identification module 132 may determine this through an inspection of the code of the view or through visual feature recognition. In some implementations, the view category identification module 132 may determine, from each thumbnail image element, that an action taken on the thumbnail image element, causes the mobile application to transition from this view to a plurality of views that correspond to the 'article' view category. As such, the view category identification module 132 can determine that this view is a 'menu' view, through which one or more views including articles can be accessed. In some implementations, the view category identification module 132 may heuristically identify such a view as a 'menu' view by determining similarities to views of other mobile applications that include similar layouts of elements.

The mobile application mapping module 130 can be configured to generate a data structure identifying each of the views of the mobile application identified by the mobile application mapping module 130. The data structure can further identify, for each of the identified views, the category of the view, and one more triggering actions to other views of the mobile application. The data structure can further identify transitions performed by the mobile application from one view to another view and the triggering actions that causes the mobile application to transition. The data structure can include a plurality of entries. Each entry can correspond to a particular transition. In some implementations, each entry can correspond to a combination of one or more of a view, a transition to another view, a triggering action and an element on which the triggering action was performed. In some implementations, the data structure can further identify a type of triggering action, a category of the view on which the triggering action was performed and the category of the view to which the mobile application transitions responsive to the triggering action, among others. In some implementations, the mobile application mapping module 130 can be configured to store the data structure in a memory. In some implementations, the mobile application mapping module 130 can be configured to store the data structure in a database, such as the database 140. In some implementations, the mobile application mapping module 130 can be configured to modify, update, access and maintain the data structure.

The data processing system 110 can also include one or more data stores, such as the database 140. The database can be included in the data processing system 110. In some implementations, the database may be located remote to the data processing system but accessible by the data processing system. The database can store a wide variety of content. For example, the database can store one or more candidate actions that the mobile application mapping module can perform. The database 140 can also store the data structure identifying each of the views of the mobile application identified by the mobile application mapping module 130.

Figure 2:
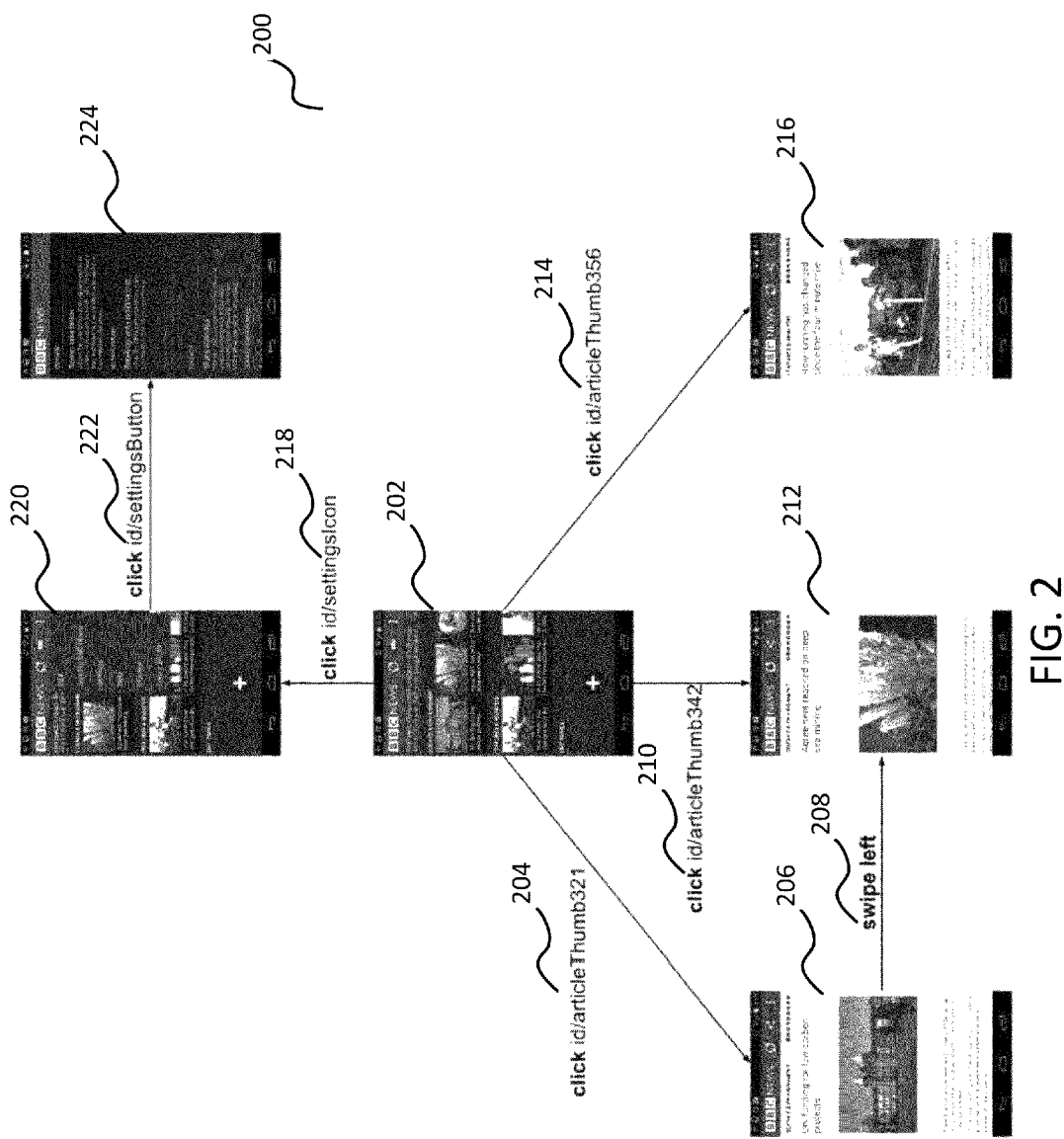
FIG. 2 depicts a map identifying a plurality of views and associated transitions between the views, according to an illustrative implementation.

FIG. 2 depicts a map identifying a plurality of views and associated transitions between the views. The plurality of views include a first view 202, a second view 206 to which the mobile application can transition from the first view 202 via a first triggering action performed on a first element. The transition has an associated identifier 204 that identifies a triggering action and the element. In some implementations, the identifier of the transition may include a first portion that identifies the triggering action type and a second portion that identifies a type of element and the identity of the element on which the triggering action was performed. The transition identifier 204 may be represented as "click id/articleThumb321." The first portion "click id" identifies that the type of triggering action is a click, while the second portion "articleThumb321" identifies that the type of element on which the triggering action was performed is an article type thumbnail element and the identity of the element is "Thumb321" or "321."

The first view 202 can also transition to a third view 212 via a second triggering action performed on a second element. This transition has an associated identifier 210 that identifies a triggering action and the element. In some implementations, the identifier 210 may be represented as "click id/articleThumb342." The first portion "click id" identifies that the type of triggering action is a click, while the second portion "articleThumb342" identifies that the type of element on which the triggering action was performed is an article type thumbnail element and the identity of the element is "Thumb342" or "342."

Similarly, the first view can also transition to a fourth view 216 via a third triggering action performed on a third element. This transition has an associated identifier 210 that identifies a triggering action and the element. In some implementations, the identifier 210 may be represented as "click id/articleThumb356." The first portion "click id" identifies that the type of triggering action is a click, while the second portion "articleThumb356" identifies that the type of element on which the triggering action was performed is an article type thumbnail element and the identity of the element is "Thumb356" or "356."

The second view 206 can transition to the third view 212 via a fourth triggering action. This transition has an associated identifier 208 that identifies the triggering action as a 'swipe left' action. The swipe can be performed on the view and may not be associated with a particular element on which to perform the swipe.

The first view 202 can also transition to a fifth view 220 via a fifth triggering action. This transition has an associated identifier 218 that identifies a triggering action and the element. In some implementations, the identifier 218 may be represented as "click id/settingsicon." The first portion "click id" identifies that the type of triggering action is a click, while the second portion "settingsicon" is the identity of the element on which the triggering action was performed.

The fifth view 220 can transition to a sixth view 224 via a sixth triggering action. This transition has an associated identifier 222 that identifies a triggering action and the element. In some implementations, the identifier 222 may be represented as "click id/settingsbutton." The first portion "click id" identifies that the type of triggering action is a click, while the second portion "settingsbutton" is the identity of the element on which the triggering action was performed.

Figure 3:
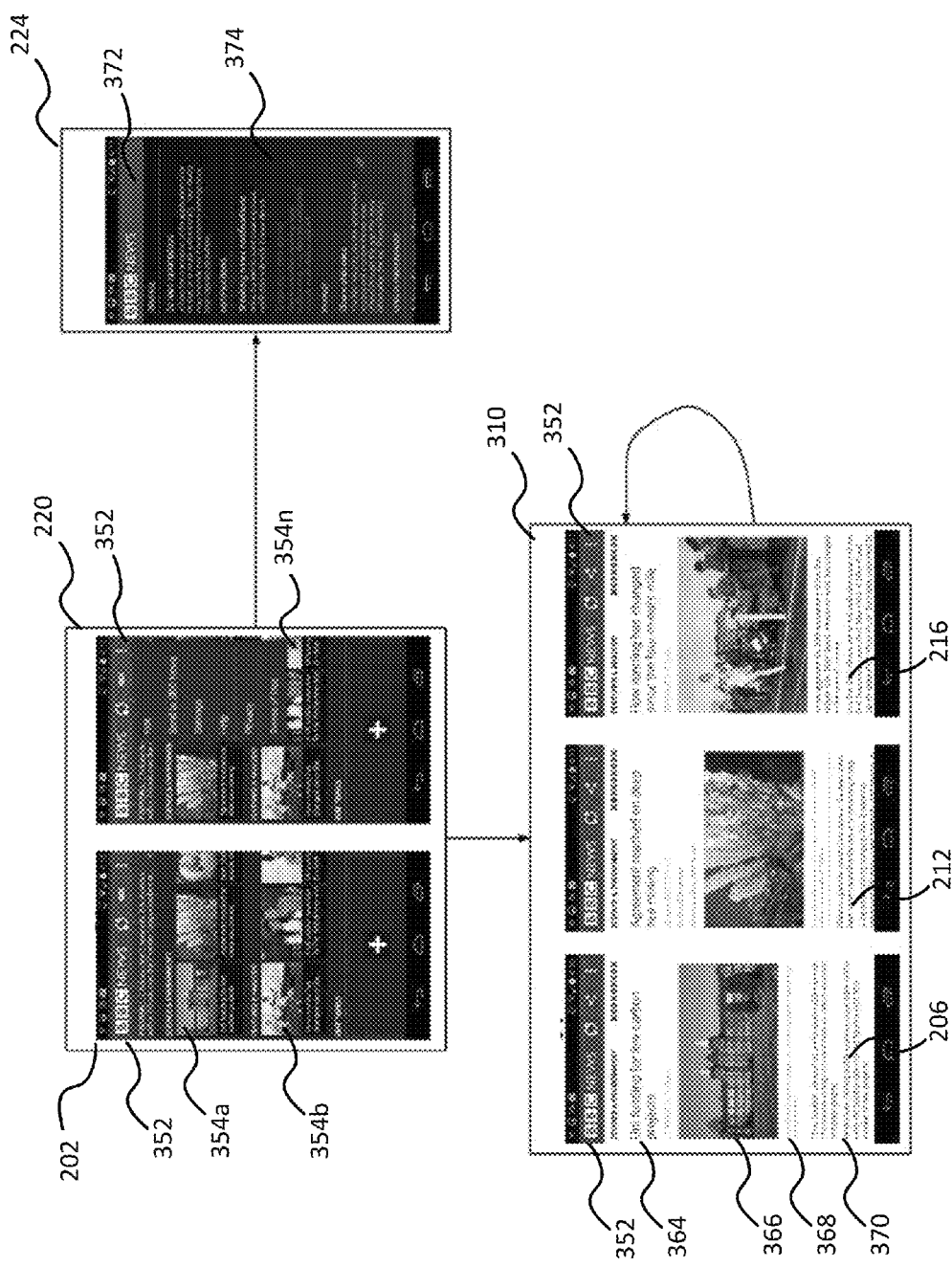
FIG. 3 depicts a plurality of view categories and the transitions between the various types of view categories, according to an illustrative implementation.

FIG. 3 depicts a plurality of view categories and the transitions between the various types of view categories. The views shown in FIG. 3 are identical to the views shown in FIG. 2. The first view 202 and the fifth view 202 belong to a first view category. Both the first view and the fifth view include a header portion 352 identifying a logo and a plurality of menu icons. Below the header portion 352 is a plurality of thumbnails 354, each of which corresponds to different views that include content related to the images shown in the thumbnails.

The second view 206, the third view 212 and the fourth view 216 belong to a second view category. These views are similar to one another in that they each include the header portion 352 identifying the logo, and the plurality of menu icons similar to the first and fifth views. Each of the second, third and fourth views also includes a header 364, an image below the header 366, a description 364 of the image below the image 366 and a text portion 370 corresponding to the article shown in the view. Although the header, image, description and text portion are all different in each of the second view 206, the third view 212 and the fourth view 216, each of these views include the elements arranged in the particular manner described above.

The sixth view 224 belongs to a third view category. This view includes a different header portion 372 only identifying the logo. The sixth view 224 corresponds to a settings page and includes elements that are different from the elements shown in views corresponding to the first view category or the second view category.

Figure 4:
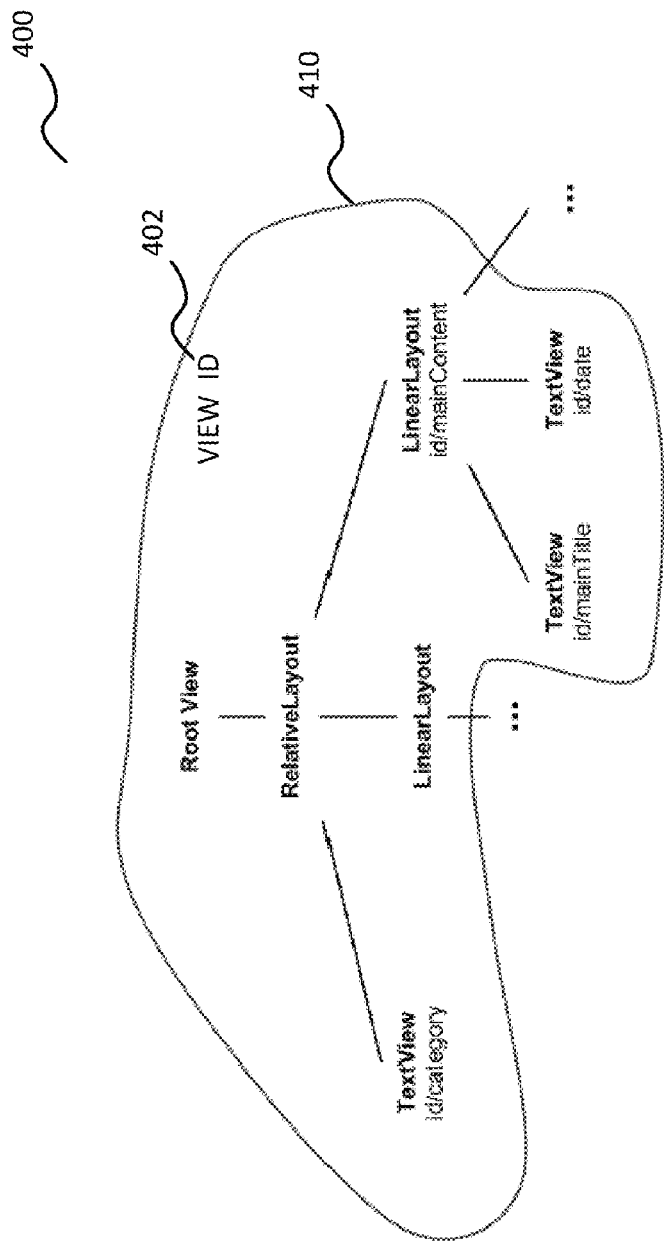
FIG. 4 depicts a tree structure of a plurality of elements of a view category, according to an illustrative implementation.

FIG. 4 depicts a tree structure of a plurality of elements of a view category. The mobile application mapping module 130 can be configured to generate a tree structure 400 for each view. The tree structure identifies the view identifier 402 identifying the view of the mobile application to which the tree structure corresponds. The tree structure 400 includes a plurality of elements, each corresponding to a particular view hierarchy. The view hierarchy can include elements (for example, objects, buttons, among others) corresponding to a root view. Such elements may exist in each view of the mobile application. In some implementations, the view category identification module 132 can be configured to determine a view category of a view based on the tree structure of the view. The elements or components included in the boundary 410 of the tree structure 400 may correspond to a stable portion of the view.

In some implementations, the view category identification module 132 or another module of the data processing system 110 can be configured to create a view hierarchy tree. In some implementations, the view hierarchy tree can be created by a software development kit (SDK) or the operating system on which the mobile application is executing. In some implementations, the view hierarchy defines the relationships of views and elements with each other. In some implementations, the view hierarchy can take the shape of an inverted tree structure with the view being the top node of the tree. Each element has a parent-child relationship, for example, a view has elements, such as a menu, a table of contents, among others. Each of the elements may include one or more sub-elements that depend from the elements.

The tree structure 400 shown in FIG. 4 represents the arrangement of elements of a particular view. As such, the tree structure 400 may serve as a node of a greater graph, for example, the graph representing all of the views of the mobile application, such as the layout of views shown in FIG. 2. In some implementations, the mobile application mapping module 130 may be configured to generate or create the view hierarchy tree of each of the views as well as the application graph. In some other implementations, the mobile application mapping module 130 may be configured to generate or create the application graph, while another module, which in some implementations, may be an SDK, may be used to create view hierarchy tree of each of the views. In this way, the data processing system 110, via the mobile application mapping module 130 and one or more other modules, may generate view hierarchy tree structures for each of the views of the mobile application and use these tree structures as nodes that serve as part of a larger tree structure representing the layout of the views of the mobile application generated by the mobile application mapping module 130.

In some implementations, the system and methods described herein for identifying elements of a mobile application may be performed by a data processing system 110 that is independent from the content publisher's computing device and an end user computing device on which the mobile application can execute. In some implementations, the data processing system 110 can be part of the content publisher's computing device or the end user computing device on which the mobile application can execute.

Figure 5:
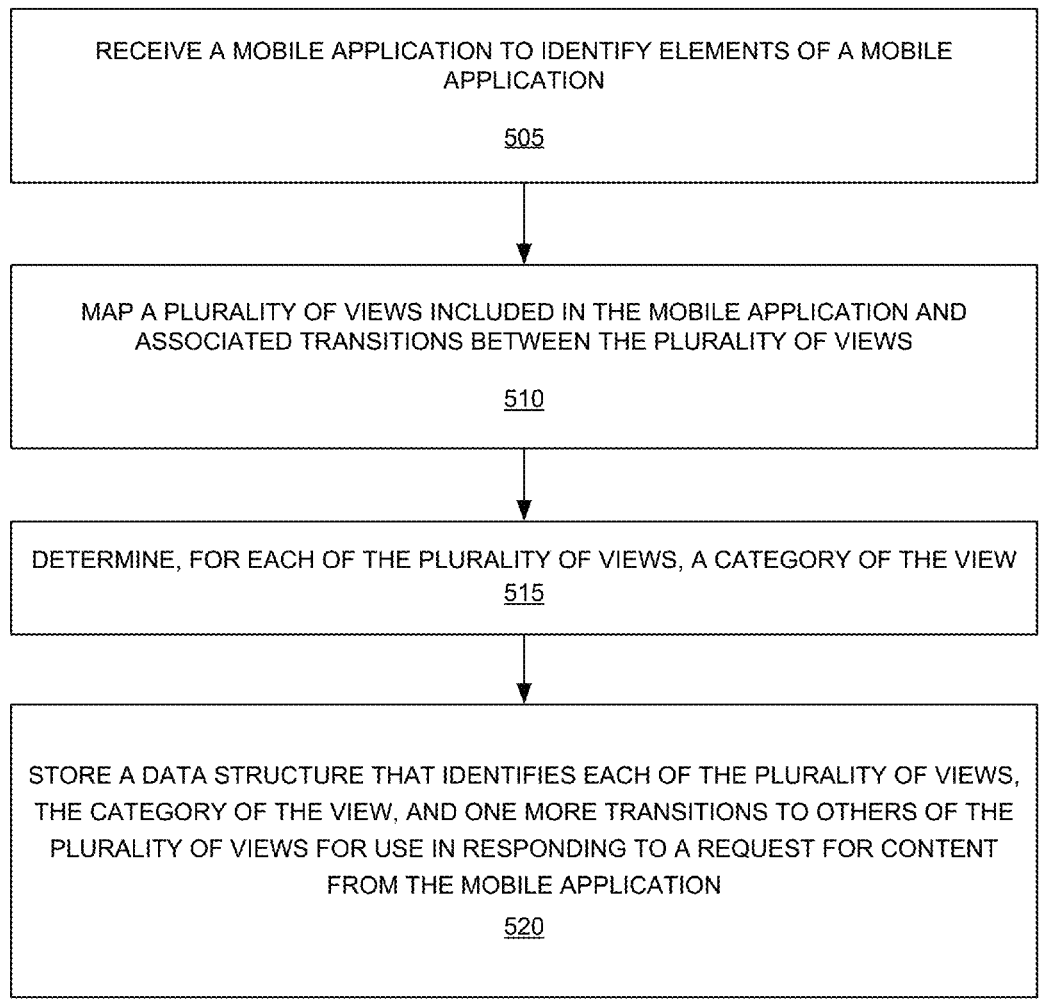
FIG. 5 is a flow diagram depicting one implementation of the steps taken to identify elements of a mobile application, according to an illustrative implementation.

FIG. 5 is a flow diagram depicting one implementation of the steps taken to identify elements of a mobile application. In particular, FIG. 5 illustrates a flow diagram depicting a method 500 for identifying elements of a mobile application. One or more processors can receive a request to identify elements of a mobile application (BLOCK 505). The processors can map a plurality of views included in the mobile application and associated transitions between the plurality of views (BLOCK 510). For each of the plurality of views, the processors can determine a category of the view (BLOCK 515). The processors can then store, for the mobile application, a data structure identifying each of the plurality of views, and for each of the plurality of views, the category of the view, and one more transitions to others of the plurality of views for use in responding to a request for content from the mobile application (BLOCK 520).

In further detail, the one or more processors can receive a request to identify elements of a mobile application (BLOCK 505). In some implementations, the request can be received from a mobile application developer or publisher. In some implementations, the request can include a mobile application. In some implementations, the request can identify a mobile application for which to identify elements. In some implementations, the request can be received via an interface through which a mobile application developer or publisher may request to insert third-party content during execution of the mobile application on a computing device of an end user. In some implementations, the processors can be executing on a data processing system separate from the computing device on which the mobile application is executing. In some implementations, the processors can be executing on the computing device on which the mobile application is executing.

The processors can map a plurality of views included in the mobile application and associated transitions between the plurality of views (BLOCK 510). In some implementations, to map the plurality of views included in the mobile application and associated transitions between the plurality of views, the processors can identify one or more views of the mobile application and one or more elements in the identified views, one or more triggering actions that cause the mobile application to transition from one view to another view.

The processors can identify elements within each view of the mobile application. In some implementations, an element of a mobile application can include any type of object, including but not limited to visible objects, non-visible objects, for example, code or other structures. In some implementations, the element can be any object capable of being identified by the processors. In some implementations, the elements can be visible objects that are displayed within a view of the mobile application. In some implementations, elements may be identified by one or more tags associated with a code of the mobile application.

In some implementations, the processors can identify elements within a view in various ways. In some implementations, the processors can identify elements within a view by visually analyzing the view to identify visual objects, such as icons, buttons, among others. The processors can identify edges of a visual object to identify the boundary of an element.

In some implementations, the processors can identify elements by crawling the view of the mobile application. In some implementations, to crawl the view of the mobile application, the processors can perform one or more actions on pixels of the view. In some implementations, the processors can perform a set of one or more actions on each pixel of the view and identify clusters of pixels that generate the same response to a particular set of actions. Each cluster of pixels can then be identified as an element.

In some implementations, the processors can inspect a code associated with the view of the mobile application to identify one or more elements. In some implementations, the processors can identify tags, objects, or other identifiers that may indicate that a particular portion of the code corresponds to an element. In some implementations, an element can be an icon, a link, or any other set of pixels that can be represented as an element based on how the pixels respond to a particular action.

The processors can assign an identifier to each of the elements identified in one or more of the views of the mobile application. In some implementations, the identifier may identify the element as well as the view in which the element is included. In some implementations, the identifier can also identify the type of element. In some implementations, the processors can determine the type of element based on visual characteristics of the element. For example, the processors may determine that an element is a button based on the shape and text appearing on the element. In some implementations, the processors may determine the type of element based on one or more triggering actions that can be performed on the element. For example, the element can be a button if the triggering action corresponds to a single tap. In some implementations, the processors may determine the type of element by parsing the code of the mobile application.

The processors can identify a plurality of views of the mobile application. In some implementations, the processors can identify a first view of the mobile application by launching or executing the mobile application in a simulator or emulator. In some implementations, the processors can then execute one or more actions on one or more elements or portions of the first view to cause the mobile application to transition from the first view to one or more other views. The processors can then identify elements for each of the views to which the mobile application transitions and execute one or more actions on the elements of these views to identify additional views. Once all of the views to which the mobile application can transition have been analyzed to identify elements and actions performed on the elements and no other views are identified through transitions, the processors may determine that all of the views of the mobile application have been identified.

In some implementations, the processors can identify, for each view, one or more other views to which the mobile application can transition responsive to one or more actions being performed on the view. In some implementations, the processors can identify the plurality of views by inspecting the code of the mobile application and parsing through the code to identify identifiers associated with views of the mobile application. In some implementations, the processors may receive additional information from the mobile application developer or publisher to identify one or more identifiers identifying the views. In some implementations, the processors can identify all of the plurality of views from information received by the mobile application developer or publisher.

In some implementations, the processors can also identify, for each view of the plurality of views of the mobile application, one or more triggering actions that cause the view to transition to another view of the plurality of views of the mobile application. In some instances, a triggering action may be associated with an element. However, in some instances, a triggering action may not be associated with a particular element, but rather is associated with the view itself.

In some implementations, the processors can create, store or maintain a data structure that includes a plurality of candidate actions that can be performed on one or more views. In some implementations, these candidate actions can include actions used as triggering actions in one or more mobile applications. Examples of candidate actions can include swipes in one or more directions (left-to-right, right-to-left, top-to-bottom, bottom-to-top), a double tap, a long tap, a short tap, an outward pinch, an inward pinch, among others. Other examples of candidate actions can include actions performed on one or more dedicated input buttons of the computing device. In some implementations, the processors can update the data structure to include additional candidate actions that the mobile application mapping module identifies as triggering action while performing methods to identify elements of a mobile application. In some implementations, the processors can utilize the data structure including the plurality of actions across multiple mobile applications.

In some implementations, the processors can identify one or more triggering actions for each view. The processors can perform one or more of the candidate actions included in the data structure on the view. For each action performed, the processors can determine whether the mobile application transitions from the view to another view. If the processors determine that a transition occurred, the processors identify the action performed as a triggering action for the view. In this way, the processors can identify triggering actions for each view.

The processors can perform one or more of the candidate actions included in the data structure on the view by executing a script capable of performing these actions. In some implementations, the actions do not need to actually be performed. Rather, the processors can generate code or execute instructions that emulate one or more of these actions.

In some implementations, the processors can identify one or more triggering actions for each view by parsing the code of the mobile application. In some implementations, the processors can identify one or more triggering actions for each view from information received from the mobile application developer or publisher.

In some implementations, the processors can identify, for each element identified in the view, one or more triggering actions that cause the mobile application to transition from the view to another view of the mobile application. The processors can perform one or more of the candidate actions to identify which of the candidate actions are triggering actions for each of the elements identified in the view. It should be appreciated that different triggering actions performed on the same element can cause the mobile application to transition from the view to other views that are different from one another. In some implementations the processors can identify a first triggering action associated with a first view of the plurality of views and identify a second view of the plurality of views to which the mobile application transitions in response to the first action on the first view. The processors can then identify a second triggering action performed on the first view and identify a third view of the plurality of views to which the mobile application transitions in response to the second triggering action on the first view.

In some implementations, the processors may map the plurality of views included in the mobile application and associated transitions between the plurality of views by determining, for at least a first view, one or more actions associated with the first view and identifying, for at least one action of the actions associated with the first view, a subsequent view to which the mobile application transitions responsive to the identified action associated with the first view.

In some implementations, the processors may map the plurality of views included in the mobile application and associated transitions between the plurality of views by identifying a first action associated with a first view of the plurality of views and identifying a second view of the plurality of views to which the mobile application transitions responsive to the first action on the first view. The processors may then identify a second action associated with the first view and identify a third view of the plurality of views to which the mobile application transitions responsive to the second action on the first view.

In some implementations, the processors may map a plurality of views included in the mobile application and associated transitions between the plurality of views by assigning, an action identifier to the at least one action. In some implementations, the processors can assign an identifier uniquely identifying each of the identified triggering actions. In some implementations, the identifier can be generated based on information relating to the type of triggering action, the element associated with the triggering action, the view on which the triggering action was performed, the view to which the mobile application transitioned in response to performing the triggering action, among others.

The processors can determine a category of the view for each of the plurality of views (BLOCK 515). In some implementations, the processors can determine a view category of a view based on a view identifier identifying the view. In some implementations, the view identifier can be provided by the mobile application developer and/or publisher. In some implementations, the processors can determine a view category of a view by inspecting a layout of the view. In some implementations, the layout can correspond to an arrangement of one or more objects of the view. In some implementations, the layout can correspond to an arrangement of one or more visual objects of the view. In some implementations, the processors can determine a view category of a view by analyzing the content included in the view. In some implementations, the processors can identify content items as primary content items provided by the mobile application developer and/or publisher and determine the view category from the primary content items.

In some implementations, the processors can identify a view hierarchy for one or more of the plurality of views of the mobile application. The view hierarchy can correspond to an arrangement of one or more elements included in the view. In some implementations, the view hierarchy can correspond to an arrangement of one or more visible objects included in the view. The processors can identify a view hierarchy by identifying, either from the code of the mobile application or visually, a layout of the elements of the view. The view hierarchy can be based on the position of the element relative to other elements in the view.

In some implementations, the processors can identify, from the view hierarchy, a subset of the visual objects as a stable portion of the view hierarchy. The processors may determine that a subset of the visual objects is a stable portion of the view hierarchy based on comparing the view hierarchy of a plurality of views of the mobile application. In some implementations, the processors may identify an arrangement of a plurality of elements as a stable portion of the mobile application by determining that more than one of the views includes the same arrangement of a plurality of elements. In some implementations, the processors may identify an arrangement of a plurality of elements as a stable portion of the mobile application by first identifying an arrangement of a plurality of elements of a view, determining, for each of the plurality of elements, the type of element and then determining that more than one of the views includes the same arrangement of elements based on the type of elements. In this way, if more than one view includes a plurality of elements including an image, a title and a text portion arranged in a particular manner, the processors may identify the arrangement of the image, the title and the text portion as a stable portion of the view and associate all views including the arrangement of the image, the title and the text portion as corresponding to the same view category. A stable portion of the view may correspond to a format of the view or a template of the view. In some implementations, different views having the same format or template or arrangement of element types may belong to the same view category even though the actual content of the views are different from one another.

The processors can then store, for the mobile application, a data structure identifying each of the plurality of views, and for each of the plurality of views, the category of the view, and one more transitions to others of the plurality of views for use in responding to a request for content from the mobile application (BLOCK 520). The data structure can further identify, for each of the identified views, the category of the view, and one more triggering actions to other views of the mobile application. The data structure can further identify transitions performed by the mobile application from one view to another view and the triggering actions that causes the mobile application to transition. The data structure can include a plurality of entries. Each entry can correspond to a particular transition. In some implementations, each entry can correspond to a combination of one or more of a view, a transition to another view, a triggering action and an element on which the triggering action was performed. In some implementations, the data structure can further identify a type of triggering action, a category of the view on which the triggering action was performed and the category of the view to which the mobile application transitions responsive to the triggering action, among others. In some implementations, the processors can store the data structure in a memory. In some implementations, the processors can store the data structure in a database. In some implementations, the processors can store the data structure on a data store that is remote to the processors. In some implementations, the processors can modify, update, access and maintain the data structure. In some implementations, the processors can access the data structure to insert content in mobile applications while the mobile applications are executing on an end user computing device.

Referring now to FIG. 1 again, the data processing system 110 can be configured to automatically provide third-party content for display in a mobile application executing on a computing device. In some implementations, the data processing system 110 can be configured to insert third-party content while the mobile application is executing on the computing device. In some implementations, the data processing system 110 can insert the content according to a content insertion policy. The content insertion policy can be based on a user's interaction with the mobile application. In some implementations, the content insertion policy can be based on time, revenue per time unit, actions performed by the user, or external activities independent of the user's interaction with the mobile application, among others. In some implementations, the content insertion policy can be generated based on one or more desired goals of the mobile application developer or publisher. Examples of goals can include increasing revenue, increasing number of impressions of third-party content, increasing user engagement with the inserted third-party content, among others.

As described above, the data processing system 110 includes the content policy generation module 134. The content policy generation module 134 can be part of, or can include scripts executed by, one or more servers in the data processing system 110. In some implementations, the content policy generation module 134 can be designed, constructed or configured to generate, manage, maintain, modify a content insertion policy for inserting content within a mobile application while the mobile application is executing on a computing device. A content insertion policy can include one or more rules that specify one or more rules or parameters for inserting content. In some implementations, the content insertion policy can include one or more rules that specify conditions upon which to insert content, the type of content to insert, whether to insert the content within an existing view or in a new view interstitially between two existing views, among others. In some implementations, the content insertion policy can insert content based on actions performed by a user while the mobile application is executing on a computing device.

The content policy generation module 134 can be configured to receive a request to generate a content insertion policy. In some implementations, the content policy generation module 134 can receive the request from a mobile application developer or publisher. In some implementations, the request to generate a content insertion policy can be received along with a request to identify elements of the mobile application. The request to generate a content insertion policy can include one or more parameters according to which to generate the content insertion policy. In some implementations, the request to generate a content insertion policy may not include any parameters.

The content policy generation module 134 can generate the policy based on one or more parameters included in the request to generate the content insertion policy. In some implementations, the parameters may include specific rules regarding the insertion of content. For example, the rule may specify that content is to be inserted as interstitial ads. In some implementations, the parameters may be goal based. Goals may be performance based and may be related to the performance of the mobile application. One example of the performance of the mobile application can include an average length of time per usage session, which is the average amount of time a user uses the mobile application in a single session. Another example of the performance of the mobile application can include an average number of impressions received by third-party content per usage session, which is the average number of impressions inserted third-party content items receive per usage session. In some implementations, the content policy generation module 134 can determine statistics based on usage related data by monitoring the usage of the mobile application executing on one or more computing devices. In some implementations, the data processing system 110 can be configured to track the usage of the mobile application by inserting a snippet of code that allows the data processing system 110 to receive information related to the usage of the mobile application. In some implementations, the data processing system 110 can otherwise receive usage related data from the mobile application executing on one or more computing devices via one or more servers with which the mobile application communicates while executing on the computing devices. In some implementations, the data processing system 110 cane be configured to analyze the received information and determine performance metrics of the mobile application based on the usage related data. In some implementations, the data processing system 110 can be configured to weight the usage related data. In some implementations, the data processing system 110 may filter out data corresponding to usage sessions that were prematurely terminated or otherwise interrupted, for example, due to an incoming phone call or text message when determining performance metrics of the mobile application.

The content policy generation module 134 can be configured to determine one or more rules to include in the content insertion policy based on the one or more parameters included in the request to generate the content insertion policy. The content policy generation module 134 can define rules based on the parameters included in the request. For example, the content policy generation module 134 can define a rule to insert an interstitial ad each time the mobile application transitions from a first view category to a second view category. The content policy generation module 134 can define another rule to provide, for display, an interstitial ad after every 15 seconds. In some implementations, the content policy generation module 134 can define a rule to provide, for display, an interstitial ad after every 15 seconds only if the current view provided for display by the mobile application belongs to a particular view category, for example, an article view category.

The content policy generation module 134 can generate rules to include in the content insertion policy based on a mapping of views of the mobile application. In some implementations, the content policy generation module 134 can identify the data structure generated by the mobile application mapping module 130 that identifies elements and views of the mobile application and associated transitions between the views of the mobile application. In some implementations, the content policy generation module 134 can generate one or more rules for inserting content each time the mobile application transitions from one view category to another view category. In some implementations, the content policy generation module 134 can generate one or more rules for inserting content each time the mobile application transitions from a particular view category to another particular view category. For example, a content insertion policy can facilitate the insertion of content each time a mobile application transitions from a view corresponding to a "home page" view category to a view corresponding to an "article" view category. In some implementations, the content insertion policy can include one or more rules for inserting content each time the mobile application transitions from a particular view to another particular view, for example, from the third view of a corresponding view category to a fourth view of the same category.

The content policy generation module 134 can generate rules to include in the content insertion policy based on one or more actions performed on the mobile application. In some implementations, the content policy generation module 134 can identify a set of one or more actions and create a rule based on the identified set of actions. In some implementations, the set of actions can specify a view or an element of a view on which one or more of the set of actions is taken. For example, the set of actions can include clicking on a first thumbnail of a first view, swiping from left to right on a second subsequent view, and swiping from left to right on a third subsequent view. In some implementations, the content policy generation module 134 can generate rules to include in the content insertion policy based on one or more actions performed on the mobile application as well as one or more transitions experienced by the mobile application. For example, clicking on a thumbnail may correspond to an action, but the result of the click is a transition from a first view to a second view. As such, the content policy generation module 134 can generate rules that may be based on actions or corresponding transitions.

In some implementations, the content policy generation module 134 can generate rules based on statistics related to usage of the mobile application. In some implementations, the content policy generation module 134 can be configured to access statistics related to the usage of the mobile application. In some implementations, one or more modules of the data processing system 110 may be configured to monitor the usage of the mobile application executing on multiple computing devices. In some implementations, the data processing system 110 can create entries for each time an instance of the mobile application executes on a computing device. The data processing system 110 may be able to do so by monitoring communications between the mobile application and one or more servers with which the mobile application communicates while the mobile application is executing on a computing device.

The data processing system 110 can be configured to communicate with the mobile application or the one or more servers with which the mobile application communicates. In some implementations, the data processing system 110 can receive usage related data and statistics from the mobile application or the one or more servers with which the mobile application communicates. The data processing system 110 can be configured to create an entry for each usage session of the mobile application. A usage session may begin when the mobile application is launched on a computing device and may terminate when the execution of the mobile application is terminated at the computing device or when there is no activity on the mobile application for a predetermined amount of time. When a mobile application is launched on the computing device, the mobile application can begin communicating with one or more servers. Information related to this communication can be provided to the data processing system 110. The data processing system 110 can be configured to identify the communication, determine that an existing session does not exist for this particular mobile application executing on the particular computing device, and generate a usage session corresponding to the mobile application executing on the particular computing device. The data processing system 110 can be configured to create the entry related to the session and may update the entry to include one or more communications received from the mobile application or transmitted to the mobile application. In some implementations, the communications can include indications of actions performed on the mobile application, the view and/or element or the category of view and/or element on which the action is performed, as well as transitions between views that occur due to the actions. It should be appreciated that each session corresponds to a mobile application that is executing on a particular computing device, such that two mobile applications executing on two separate computing devices would each correspond to separate sessions.

In some implementations, the data processing system 110 can retrieve usage related data related to the usage of the mobile application executing on computing devices from one or more servers with which the mobile application communicates. In some implementations, the usage related data can include a date, time and location at which the mobile application was launched, the views of the mobile application that were displayed, the transitions between the views of the mobile application that were displayed, the elements and actions associated with the transitions, among others. In addition, the usage related data may also include information related to one or more third-party content items provided for display during the execution of the instances of the mobile application, the type of third-party content items, the view in which the third-party content items were displayed, the performance of the third-party content items, among others.

In some implementations, the content policy generation module 134 can be configured to analyze information stored in each session to identify trends. These trends may be indicative of how users interact with the mobile application. By analyzing the information stored in the sessions, the content policy generation module 134 can identify the frequency at which one or more views are accessed, the frequency at which one or more view categories are accessed, the frequency at which one or more transitions take place, as well as other information related to how users are interacting with the mobile application, among other data. The content policy generation module 134 may analyze the data to predict one or more actions to be performed on the mobile application. In some implementations, the prediction can be based on the type of user using the mobile application.

In some implementations, the content policy generation module 134 can generate rules to achieve one or more goals based on information related to usage sessions. These goals may be provided by the mobile application developer or publisher. In some implementations, these goals may be provided by the data processing system 110. In some implementations, the goals may include increasing revenue for the mobile application developer or publisher. In some implementations, the goals may include achieving a particular impression count per session. In some implementations, the goals may include achieving a particular impression count for a particular type of content.

In some implementations, the content policy generation module 134 can determine rules based on heuristics. For example, the content policy generation module 134 can determine rules based on previously inserted content and the performance of the content. For instance, the content policy generation module 134 can determine, from the usage session related data that usage sessions are terminating more frequently than otherwise when at least three interstitial ads are displayed within 30 seconds. As such, the content policy generation module 134 can determine this behavior and create a rule that prevents displaying three interstitial ads within 30 seconds. In some implementations, the content policy generation module 134 can monitor the behavior of users interacting with other mobile applications and determine rules based on content insertion policies of other mobile applications.

In some implementations, the content policy generation module 134 may use heuristics to determine where to insert content. For example, the content policy generation module 134 may determine that content inserted in between a transition from the third view of the view category 'article' to the fourth view of the same view category 'article' generates a click through rate that is less than a click through rate of content inserted in between a transition from the second view of the view category 'article' to the third view of the same view category 'article.' In some implementations, the content policy generation module 134 may determine to insert content in between a transition from the second view of the view category 'article' to the third view of the same view category 'article' to improve the performance of the inserted content.

In some implementations, the content policy generation module 134 may use heuristics to determine what type of content to insert. For example, the content policy generation module 134 may determine that image creatives inserted between a transition from the third view to the fourth view of the same view category generate a lower click through rate than a video creative inserted between a transition from the third view to the fourth view of the same view category. As such, the content policy generation module 134 may determine to insert a video creative instead of an image creative between a transition from the third view to the fourth view of the same view category. In some implementations, the content policy generation module 134 may heuristically determine that image creatives generate higher click through rates than video creatives when inserted between a transition from the second view to the third view of the same view category. As such, the content policy generation module 134 may determine to insert an image creative instead of a video creative between a transition from the second view to the third view of the same view category.

The content policy generation module 134 can be configured to generate one or more predetermined content insertion policies that are geared towards specific goals. For instance, a first content insertion policy can be geared to increase revenue for the mobile application. This may be possible by defining rules that insert content more frequently than other content insertion policies, inserting types of content that generate greater revenue (for example, video ads instead of image ads), among others. A second content insertion policy can be geared to improve user experience for the mobile application. In such a content insertion policy, the number of content insertion opportunities may be reduced and the types of content provided for display may be limited to banner ads instead of interstitial ads. Other types of content insertion policies may be generated based on one or more goals.

The content policy generation module 134 can be configured to provide, to the mobile application developer or publisher, one or more content insertion policies to include in the mobile application. In some implementations, the content policy generation module 134 can automatically associate the content insertion policies to the mobile application. In some implementations, the content policy generation module 134 can be configured to provide the content insertion policies to one or more servers of the mobile application developer or publisher.

The mobile application developer or publisher may receive the content insertion policies and modify the mobile application to include the content insertion policies. In this way, the mobile application, when installed and executing on a computing device, may determine whether a content insertion policy has been met. In some implementations, the servers with which the mobile application communicates may receive the content insertion policies and may be configured to determine whether any of the content insertion policies have been met in response to communications received from the mobile application. In some implementations, the data processing system 110 can be configured to determine whether any of the content insertion policies have been met in response to communications received from the mobile application or one or more of the servers with which the mobile application communicates.

The content insertion module 136 can be part of, or can include scripts executed by, one or more servers in the data processing system 110. In some implementations, the content insertion module 136 can be designed, constructed or configured to insert content within a mobile application. In some implementations, the content insertion module 136 may be configured to insert content in response to determining that one or more conditions for inserting content have been met.

In some implementations, the content insertion module 136 may be configured to identify one or more actions performed on the mobile application executing on a computing device. The content insertion module 136 can then determine whether the one or more actions matches or corresponds to a predetermined set of actions associated with a rule for inserting content. In some implementations, the content insertion module 136 may be configured to identify the predetermined set of actions associated with each rule for inserting content of one or more applicable content insertion policies. The content insertion module 136 may then receive an indication of an action performed on the mobile application and determine whether the action matches any of the predetermined set of actions. If no match is found, the content insertion module 136 determines that a content insertion opportunity has not arisen and therefore, no content needs to be inserted.

In some implementations, the content insertion module 136 may keep a track of each action performed on the mobile application such that when a subsequent action is performed on the mobile application, the content insertion module 136 can determine whether the subsequent action in conjunction with the previously performed actions match any of the predetermined set of actions associated with a rule for inserting content.

In some implementations, the content insertion module 136 can identify the context of one or more actions performed on the mobile application. In some implementations, the context of an action can identify a view on which the action was performed, a view category of the view on which the action was performed, an element on which the action was performed, or the type of element on which the action was performed, among others. In some implementations, determining whether one or more actions performed on the mobile application match the predetermined set of actions associated with a rule to insert content may include determining, for each of the one or more actions, that the context of the action matches the context associated with the corresponding action of the predetermined set of actions.

In some implementations, the content insertion module 136 can be configured to identify a usage session of the mobile application. From the identified session, the content insertion module 136 can determine one or more actions performed on the mobile application during the usage session. In some implementations, the content insertion module 136 can determine, each time an action is performed on the mobile application, if a subset of the action performed and one or more actions previously performed during the usage session matches the predetermined set of actions associated with a rule to insert content. The content insertion module 136 can determine that content is to be inserted responsive to determining that the subset of the action and the one or more actions previously performed matches one of the predetermined set of actions associated with a rule to insert content.

As described above, the content insertion module 136 may be configured to identify a predetermined set of transitions associated with a rule to insert content. Although transitions may occur in response to an action being performed, the content insertion policy for inserting content can include one or more rules that are based on transitions instead of or in addition to actions. As such, the content insertion module 136 can determine a transition occurring at the mobile application and determine whether the transition matches any of the set of predetermined transitions associated with a rule to insert content. Similar to actions matching any of the set of predetermined actions associated with a rule to insert content, the content insertion module 136 can determine that a content inserting opportunity has arisen in response to determining that the transition or a combination of the transition and one or more previously occurring transitions matches any of the set of predetermined transitions.

The content insertion module 136 can be configured to insert content according to the content insertion policy in response to determining that a content insertion opportunity has arisen. The content insertion policy may specify the type of content to insert, the location at which to insert the content, including any other rules for inserting content. In some implementations, the content insertion policy can specify inserting content as an interstitial ad in between a transition from a first view to a second view. In some implementations, the content insertion module 136 can determine, from the content insertion policy, to insert the content as an interstitial ad, which is inserted as a view in between two previously adjacent views. Two views are adjacent to one another if the mobile application can directly transition from one of the two views to the other of the two views without having to view any other views. In some implementations, the content insertion module 136 can determine, from the content insertion policy, to insert the content as a banner ad, which corresponds to inserting the content in an existing view. The content insertion policy can specify the view to which to insert the content. In some implementations, the content insertion policy can uniquely identify the view to which to insert the content.

In some implementations, the content insertion module 136 can determine to insert content in between a transition from a current view of the mobile application to a subsequent view of the mobile application to which the mobile application is supposed to transition responsive to the last performed action. In some implementations, the content is inserted as an interstitial view. In some implementations, the content is inserted in a content slot defined in one of the existing views of the mobile application, for example, the subsequent view to which the mobile application is supposed to transition in accordance to a map of the views of the mobile application generated by the mobile application mapping module 130.

In some implementations, the content insertion module 136 can be configured to insert content in a content slot. In some implementations, the content insertion module 136 can be configured to insert a content slot in response to identifying a content insertion opportunity and then inserting content selected for insertion in the content slot. The content insertion module 136 can insert a content slot in accordance with the content insertion policy. If the content insertion policy indicates inserting the content within an existing view, the content insertion module 136 can insert the content slot within an existing view of the mobile application. In some implementations, the content insertion module 136 may identify the view within which to insert the content slot. In some implementations, the content insertion module 136 may determine to insert the content slot within a view of the mobile application to which the mobile application is supposed to transition responsive to the last performed action. In some implementations, the content insertion policy can indicate inserting the content within an interstitial view. In some such implementations, the content insertion module 136 can be configured to insert an interstitial view including a content slot between a transition from a current view of the mobile application to a subsequent view of the mobile application to which the mobile application is supposed to transition responsive to the last performed action.

The content insertion module 136 can be configured to select a type of content for insertion. In some implementations, the content insertion module 136 can determine the type of content for insertion based on the content insertion policy. In some implementations, the content insertion module 136 can select a video-based content item, an image based content item, an actionable object, or any creative. In some implementations, the creative can be a third-party content item, an in-app purchase opportunity, a third-party application to install, among others. In some implementations, the content insertion module 136 can be configured to submit a request to a content serving module that may be or may not be part of the data processing system 110. The content serving module may then select content to serve to the mobile application and provide the selected content to the content insertion module 136.

The content insertion module 136 or a content serving module of the data processing system 110 can be configured to select content for insertion based on one or more parameters. In some implementations, the content insertion module 136 can select content that is relevant to a user or a profile associated with the computing device on which the mobile application is executing. In some implementations, the content insertion module 136 can select content that is relevant to a profile associated with the mobile application.

In some implementations, the content insertion module 136 can be configured to select content via an auction.

In some implementations, the content insertion module 136 may be configured to select content based on one or more goals. These goals may be defined by the mobile application developer or publisher. In some implementations, these goals may be defined by the data processing system 110. In some implementations, one goal may be to achieve a threshold click through rate of inserted content. As such, the content insertion module 136 may select a content item that has a high click through rate for insertion to achieve the threshold click through rate. In some implementations, one goal may be to achieve a threshold revenue. In some such implementations, the content insertion module 136 may select a content item that has a high conversion rate to insert to achieve the threshold revenue.

Figure 6:
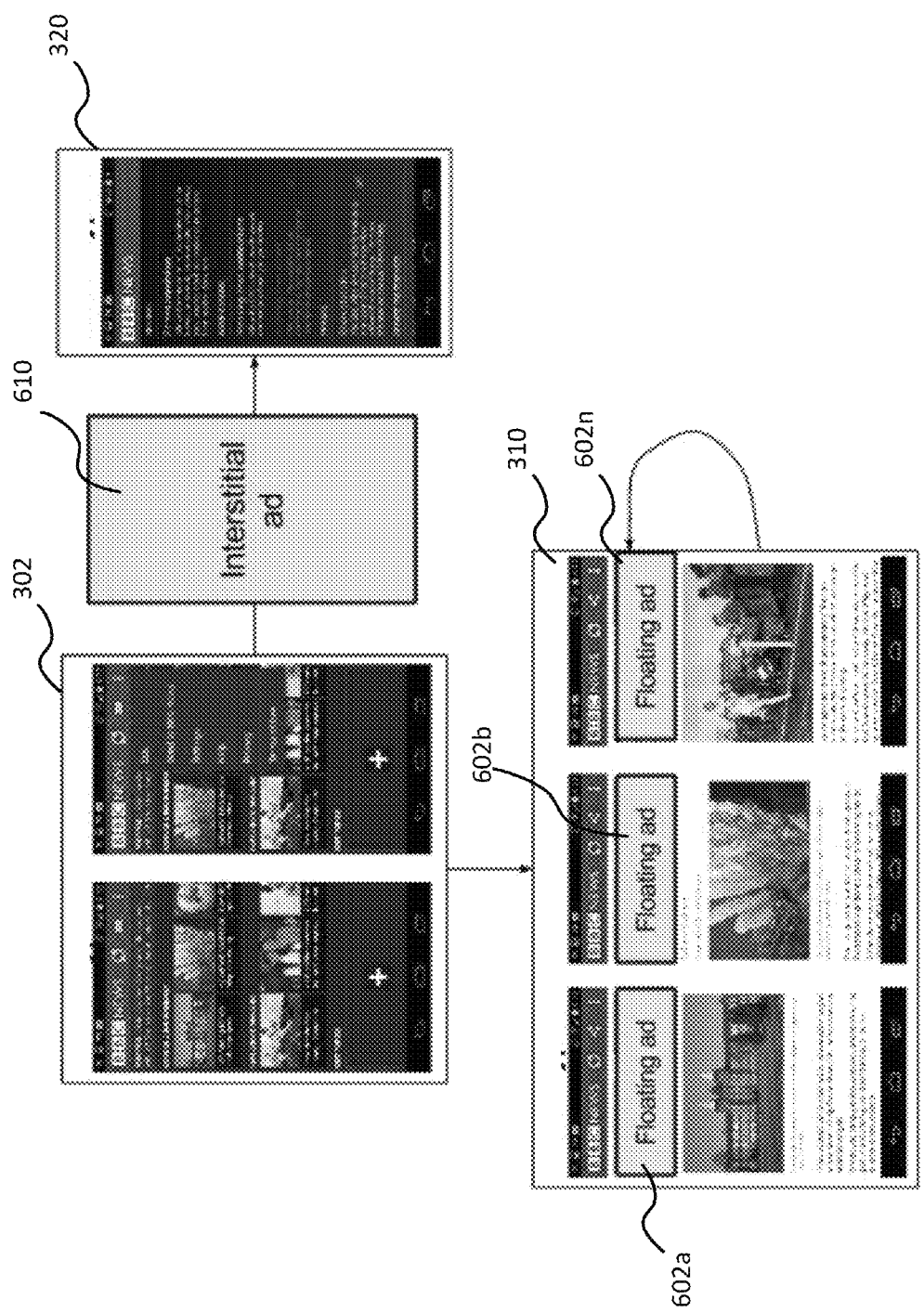
FIG. 6 depicts a plurality of view categories and content inserted in various portions of the views or during transitions between the various types of view categories, according to an illustrative implementation.

FIG. 6 depicts a plurality of view categories and content inserted in various portions of the views or during transitions between the various types of view categories. As shown in FIG. 6, in some implementations, when the mobile application transitions from a view of the first view category to a view of the second view category, a floating content slot is inserted in the view of the second view category. Further, when the mobile application transitions from a first view of the second view category to a second view of the second view category, a floating content slot is inserted in the second view.

In some implementations, when the mobile application transitions from a view of the first view category to a view of the third view category, an interstitial content slot is inserted between the transition from the view of the first view category to the view of the third view category.

In some implementations, the data processing system 110 can be configured to cause the mobile application insert a creative or a content slot, such as a floating content slot in a view in accordance with the content insertion policy. The data processing system 110 can determine that one or more conditions of the content insertion policy for inserting content have been met. The data processing system 110 can then determine whether to insert a content slot as a floating content slot within an existing view or as an interstitial view during a transition between two existing views based on the content insertion policy. The data processing system 110 can then instruct the mobile application to insert the content slot as a floating content slot within an existing view or as an interstitial view during a transition between two existing views based on the content insertion policy. Once the content slot is inserted, a creative can be selected for insertion in the content slot and provided to the mobile application for insertion. In some implementations, the creative selected for insertion can be selected based on one or more auction parameters, including but not limited to interest categories of an identifier associated with the computing device on which the mobile application is executing. In some implementations, the creative can be selected via an auction.

In some implementations, the system and methods described herein for automatically providing third-party content for display in a mobile application based on an interaction with the mobile application may be performed by a data processing system 110 that is independent from the content publisher's computing device and an end user computing device on which the mobile application can execute. In some implementations, the data processing system 110 configured to automatically provide third-party content for display in a mobile application based on an interaction with the mobile application can be part of the content publisher's computing device or the end user computing device on which the mobile application can execute.

Figure 7:
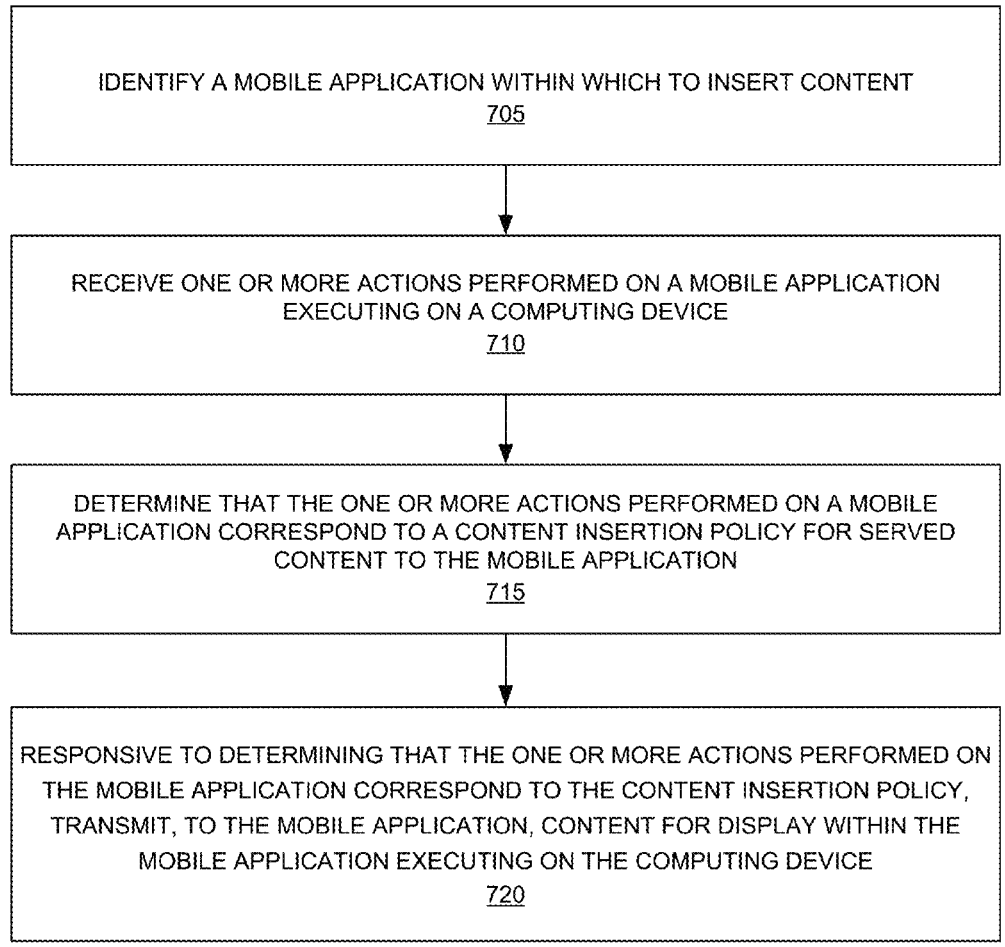
FIG. 7 is a flow diagram depicting one implementation of the steps taken to automatically provide third-party content for display in a mobile application based on an interaction with the mobile application.

FIG. 7 is a flow diagram depicting one implementation of the steps taken to automatically provide third-party content for display in a mobile application based on an interaction with the mobile application. In particular, FIG. 7 illustrates a flow diagram depicting a method 700 for automatically providing third-party content for display in a mobile application based on an interaction with the mobile application. One or more processors can identify a mobile application within which to insert content (BLOCK 705). The processors can receive one or more actions performed on a mobile application executing on a computing device (BLOCK 710). The processors can determine that the one or more actions performed on a mobile application correspond to a content insertion policy for inserting content to the mobile application (BLOCK 715). The processors can transmit, to the mobile application, content for display within the mobile application executing on the computing device responsive to determining that the one or more actions performed on the mobile application correspond to the content insertion policy (BLOCK 720).

In further detail, the processors can identify a mobile application within which to insert content (BLOCK 705). In some implementations, the processors can identify the mobile application within which to insert content from a request to insert content received by the processors. In some implementations, the processors can receive a request to insert content in a mobile application that is executing on a computing device. The mobile application may be communicating with one or more servers associated with the mobile application. The servers may determine, based on the communications with the mobile application, that an opportunity to insert content exists and may submit a request to the processors to insert content. In some implementations, the mobile application can be configured to communicate directly with the processors to request content for insertion in the mobile application. In some implementations, the mobile application can be configured to identify content serving opportunities based on actions taken on the mobile application and may insert a content slot in the mobile application. In some implementations, the mobile application can be configured to submit a request to the processors to provide content for the content slot.

In some implementations, the processors can identify a data structure of a mobile application that identifies a plurality of views, a category of each of the plurality of views, and one more transitions to others of the plurality of views for use in responding to a request for content from the mobile application. In some implementations, the processors can generate this data structure by mapping the mobile application, as described herein with respect to FIG. 5.

The processors can receive one or more actions performed on the mobile application executing on a computing device (BLOCK 710). In some implementations, the processors can receive one or more actions performed on a mobile application from the mobile application or one or more servers with which the mobile application is communicating. In some implementations, the processors can receive each action performed on the mobile application soon after the action is performed on the mobile application. In some implementations, the processors can be executing on a data processing system separate from the computing device on which the mobile application is executing. In some implementations, the processors can be executing on the computing device on which the mobile application is executing.

In some implementations, the processors can create an entry in a database for each mobile application usage session. A mobile application usage session can correspond to an interactive exchange of data between two computing entities, for example, between a computing device on which the mobile application is executing and one or more servers. The session may be initiated by launching the mobile application and may continue to remain a session until the mobile application is shut down on the computing device or the mobile application is idle for a predetermined amount of time. Each usage session can correspond to a unique computing device on which the mobile application is installed. The processors can create the entry in response to receiving a communication that the mobile application has been launched on the computing device. In this way, the processors can create separate entries for mobile applications launching on different computing devices. The processors can receive actions performed on the mobile application executing on the computing device and store the actions in the corresponding usage session as the processors receive communications relating to the actions being performed.

The processors can identify one or more actions performed on the mobile application executing on the computing device. The processors can then determine whether the one or more actions matches or corresponds to a predetermined set of actions associated with a rule for inserting content. In some implementations, the processors can identify the predetermined set of actions associated with each rule for inserting content of one or more applicable content insertion policies. The processors can then receive an indication of an action performed on the mobile application and determine whether the action matches any of the predetermined set of actions. If no match is found, the processors determine that a content insertion opportunity has not arisen and therefore, no content needs to be inserted.

In some implementations, the processors may keep a track of each action performed on the mobile application such that when a subsequent action is performed on the mobile application, the processors can determine whether the subsequent action in conjunction with the previously performed actions match any of the predetermined set of actions associated with a rule for inserting content.

In some implementations, the processors can identify the context of one or more actions performed on the mobile application. In some implementations, the context of an action can identify a view on which the action was performed, a view category of the view on which the action was performed, an element on which the action was performed, or the type of element on which the action was performed, among others. In some implementations, determining whether one or more actions performed on the mobile application match the predetermined set of actions associated with a rule to insert content may include determining, for each of the one or more actions, that the context of the action matches the context associated with the corresponding action of the predetermined set of actions.

In some implementations, the processors can identify a usage session of the mobile application. From the identified session, the processors can determine one or more actions performed on the mobile application during the usage session. In some implementations, the processors can determine, each time an action is performed on the mobile application, if a subset of the action performed and one or more actions previously performed during the usage session matches the predetermined set of actions associated with a rule to insert content. The processors can determine that content is to be inserted responsive to determining that the subset of the action and the one or more actions previously performed matches one of the predetermined set of actions associated with a rule to insert content.

As described above, the processors can identify a predetermined set of transitions associated with a rule to insert content. Although transitions may occur in response to an action being performed, the content insertion policy for inserting content can include one or more rules that are based on transitions instead of or in addition to actions. As such, the processors can determine a transition occurring at the mobile application and determine whether the transition matches any of the set of predetermined transitions associated with a rule to insert content. Similar to actions matching any of the set of predetermined actions associated with a rule to insert content, the processors can determine that a content inserting opportunity has arisen in response to determining that the transition or a combination of the transition and one or more previously occurring transitions matches any of the set of predetermined transitions.

The processors can determine that the one or more actions performed on a mobile application correspond to a content insertion policy for inserting content to the mobile application (BLOCK 715). In some implementations, the content insertion policy can include one or more rules for inserting content that are based on one or more actions performed on the mobile application during a usage session. In some implementations, the processors can generate one or more content insertion policies and associate these content insertion policies to the mobile application. In some implementations, the processors may associate these content insertion policies by including them in the mobile application or providing the content insertion policies to the mobile application developer or publisher to include the content insertion policies in the mobile application.

In some implementations, the processors can identify, for the mobile application, the content insertion policy associated with the mobile application. The processors can then determine, from the content insertion policy, one or more content insertion parameters that correspond to inserting third-party content. The processors can then identify a sequence of actions performed on the mobile application. Ad described herein, the processors may create entries for usage sessions that include information related to the actions performed on the mobile application. The processors can then determine that the sequence of actions performed on the mobile application matches one of the one or more content insertion parameters. In response to determining that the sequence of actions performed on the mobile application matches one of the one or more content insertion parameters, the processors may insert content according to the content insertion policy.

In some implementations, the processors can receive an indication that an instance of the mobile application is launched on a computing device. The processors can do so by receiving communications from the mobile application directly or from one or more servers with which the mobile application communicates. In some implementations, the mobile application can include code or other instructions that allow the processors to receive communications from the mobile application. The processors can then create a usage session responsive to receiving an indication that the mobile application is launched on the computing device. The processors can receive one or more actions performed on the instance of the mobile application in response to the actions performed on the mobile application. The processors can identify, from the actions performed on the mobile application, one or more subsets of actions. The subset of actions can include a last performed action and one or more actions previously performed during the usage session. The processors can determine that none of the one or more subsets of actions matches a sequence of actions identified in the content insertion policy. The processors can then determine that a content insertion opportunity does not exist. Stated in another way, the processors can then determine to not insert content in response to determining that none of the one or more subsets of actions matches a sequence of actions identified in the content insertion policy.

The processors can transmit, to the mobile application, content for display within the mobile application executing on the computing device responsive to determining that the one or more actions performed on the mobile application correspond to the content insertion policy (BLOCK 720). In some implementations, the processors can identify a content serving opportunity in response to determining that a condition of the content insertion policy for inserting content has been satisfied. In some implementations, the condition can be based on one or more actions taken on the mobile application. In some implementations, the condition can be based on one or more transitions between a plurality of views of the mobile application. In some implementations, the condition can be based on a sequence of transitions between the plurality of views of the mobile application. In some implementations, the condition can be based on other triggering actions, such as the receipt of an incoming call, a notification, or some other actions for which the content insertion policy has established a rule to insert content.

The processors can identify content to insert for display within the mobile application. The processors can identify a type of content to insert based on the content insertion policy. Examples of types of content can include a content format, such as an image, video, or some other type of content format. The processors an also identify a content slot within which to insert the content for display according to the content insertion policy.

In some implementations, the content insertion policy can specify inserting the content as an interstitial ad, in which case, an interstitial content slot is inserted between a transition from a first view to a second view of the mobile application. In some implementations, the content insertion policy can specify inserting the content as a banner ad within a particular view, in which case, a banner content slot is inserted within a view of the mobile application. In some implementations, the processors can determine a content slot location within a given view of the mobile application within which to insert the content slot. In some implementations, the processors can identify elements, for example, visual elements, of the view and determine a location to insert the content slot based on the position of the identified elements.

In some implementations, the processors can then select content to insert in the content slots inserted within the mobile application. The processors can select the content based on information associated with the computing device on which the mobile application is executing. In some implementations, the processors can select the content based on information included within the last displayed view of the mobile application. In some implementations, the processors can select the content based on the performance of one or more content items previously selected for insertion within mobile applications executing on one or more computing devices, including other computing devices.

The processors can select content for insertion based on one or more parameters. In some implementations, the processors can select content that is relevant to a user or a profile associated with the computing device on which the mobile application is executing. In some implementations, the processors can select content that is relevant to a profile associated with the mobile application. In some implementations, the processors can be configured to select content via an auction.

In some implementations, the processors can select content based on one or more goals. These goals may be defined by the mobile application developer or publisher. In some implementations, these goals may be defined by the data processing system. In some implementations, one goal may be to achieve a threshold click through rate of inserted content. As such, the processors may select a content item that has a high click through rate for insertion to achieve the threshold click through rate. In some implementations, one goal may be to achieve a threshold revenue. In some such implementations, the processors may select a content item that has a high conversion rate to insert to achieve the threshold revenue.

The processors can transmit the selected content for display within the mobile application. In some implementations, the processors can insert content slots according to the content insertion policy and then insert the content in the inserted content slots. In some implementations, the processors can transmit the selected content in response to receiving a request to serve content in the content slots inserted by the processors. In some implementations, these content slots are inserted in response to determining that a content insertion opportunity has arisen. In some implementations, the content slots are inserted according to the content insertion policy.

In some implementations, the processors can generate the content insertion policy based on one or more goals of the mobile application. In some implementations, the processors can identifying one or more goals for the mobile application. The processors can determine, from historical usage of the mobile application across a plurality of computing devices, one or more sequences of actions performed on the mobile application more than a threshold number of times. Stated in another way, the processors identify sequences of actions that are commonly performed on the mobile application. The processors can then create a rule to insert content after determining that any of the one or more determined sequences of actions is performed on the mobile application.

In some implementations, the processors can determine a performance of the mobile application across a plurality of computing devices. The processors can determine the performance by monitoring the usage sessions generated by the processors. The usage sessions can include information relating to usage of the mobile application, for example, the length of time a session was active, the sequence of actions performed, the types of actions performed, the number of content items inserted during the session, the performance of each of the content items, among others. The processors can analyze the performance of the mobile application and determine that the performance of the mobile application is below a threshold performance level. In some implementations, the processors can set a predetermined threshold performance level. In some implementations, the processors can set a predetermined threshold performance level based on one or more parameters received from the mobile application developer or publisher. The processors can then modify one or more rules of one or more content insertion policies to improve performance. For instance, the processors can modify a content insertion policy to identify additional content insertion opportunities.

FIG. 8 shows the general architecture of an illustrative computer system 800 that may be employed to implement any of the computer systems discussed herein (including the system 100 and its components such as the mobile application mapping module 130, the view category identification module 132, the content policy generation module 134 and the content insertion module 136) in accordance with some implementations. The computer system 800 can be used to provide information via the network 105 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included in the data processing system 110 or the other components of the system 100 such as the mobile application mapping module 130, the view category identification module 132, the content policy generation module 134 and the content insertion module 136.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 825 to store information related to one or more views of the mobile application, one or more elements of the mobile application, a mapping of the views, elements and transitions of the mobile application, one or more sessions that include information related to actions taken on the mobile application, one or more content insertion policies, among others. The memory 825 can include the database 140. The processor(s) 820 shown in FIG. 8 may be used to execute instructions stored in the memory 825 and, in so doing, also may read from or write to the memory various information processed and or generated pursuant to execution of the instructions.

The processor 820 of the computer system 800 shown in FIG. 8 also may be communicatively coupled to or control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the user can communicate with the data processing system 110.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The mobile application mapping module 130, the view category identification module 132, the content policy generation module 134 and the content insertion module 136 can include or share one or more data processing apparatus, computing devices, or processors.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 800 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the mobile application mapping module 130, the view category identification module 132, the content policy generation module 134 and the content insertion module 136 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to identifying elements of a mobile application and automatically inserting content in a mobile application, the systems and methods described herein can be applied to any information resource. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for automatically inserting third-party content within a mobile application executing on a computing device, comprising:

identifying, by one or more processors, a mobile application executing on a computing device within which to insert content;

generating, by the one or more processors, a layout of a plurality of views of the mobile application, the layout comprising a plurality of identifications of transitions between the plurality of views and a corresponding interaction triggering each transition;

receiving, by the one or more processors, a plurality of indications of interactions with the mobile application executing on a computing device;

identifying, by the one or more processors via the transitions and corresponding interactions of the layout, a set of transitions of the mobile application from an initial view of the mobile application;

determining, by the one or more processors, that the identified set of transitions from the initial view of the application corresponds to a content insertion policy for inserting third-party content to the mobile application; and transmitting, to the mobile application, third-party content for display within the mobile application executing on the computing device responsive to the determination that the identified set of transitions corresponds to the content insertion policy.

2. The method of claim 1, further comprises identifying a context associated with each of the interactions with the mobile application executing on the computing device, the context identifying a category of the view of the mobile application on which the corresponding interaction was performed and a type of interaction.

3. The method of claim 1, further comprising providing, for display, the third-party content in a view of the mobile application that is between a transition from a first view and a second view.

4. The method of claim 1, further comprising:
identifying, for the mobile application, the content insertion policy associated with the mobile application from a plurality of content insertion policies;
determining, from the content insertion policy, one or more content insertion parameters that correspond to inserting third-party content; and
determining that the indicated plurality of interactions with the mobile application matches one of the one or more content insertion parameters.

5. The method of claim 1, further comprising:
generating the content insertion policy; and
associating the content insertion policy with the mobile application.

6. The method of claim 5, wherein generating the content insertion policy includes:
identifying, for the mobile application, one or more goals;
determining, from historical usage of the mobile application across a plurality of computing devices, one or more sequences of interactions performed on the mobile application more than a threshold number of times; and
creating a rule to insert content after determining that any of the one or more determined sequences of interactions is performed on the mobile application.

7. The method of claim 6, further comprises:
determining a performance of the mobile application across a plurality of computing devices;
determining that the performance of the mobile application is below a threshold performance level; and
modifying the content insertion policy to include additional content insertion opportunities.

8. The method of claim 1, further comprises:
receiving, by the one or more processors, an indication that the mobile application is launched on a computing device;
generating a session responsive to receiving an indication that the mobile application is launched;
identifying, from the indicated plurality of interactions with the mobile application, one or more subsets of interactions;
determining that none of the one or more subsets of interactions matches a sequence of interactions identified in the content insertion policy; and
determining to not insert content in response to determining that none of the one or more subsets of interactions matches a sequence of interactions identified in the content insertion policy.

9. A system of automatically identifying elements in a mobile application, comprising:
a memory; and
one or more processors configured to:
identify a mobile application executing on a computing device within which to insert content;
generate a layout of a plurality of views of the mobile application, the layout comprising a plurality of identifications of transitions between the plurality of views and a corresponding interaction triggering each transition;
receive a plurality of indications of interactions with the mobile application executing on a computing device;
identify, via the transitions and corresponding interactions of the layout, a set of transitions of the mobile application from an initial view of the mobile application;
determine that the identified set of transitions from the initial view of the application corresponds to a content insertion policy for inserting third-party content to the mobile application; and
transmit, to the mobile application, third-party content for display within the mobile application executing on the computing device responsive to the determination that the identified set of transitions corresponds to the content insertion policy.

10. The system of claim 9, wherein the one or more processors is further configured to identify a context associated with each of the interactions with the mobile application executing on the computing device, the context identifying a category of the view of the mobile application on which the corresponding interaction was performed and a type of interaction.

11. The system of claim 9, wherein the one or more processors is further configured to provide, for display, the third-party content in a view of the mobile application that is between a transition from a first view and a second view.

12. The system of claim 9, wherein the one or more processors is further configured to:
identify, for the mobile application, the content insertion policy associated with the mobile application from a plurality of content insertion policies;
determine, from the content insertion policy, one or more content insertion parameters that correspond to inserting third-party content; and
determine that the indicated plurality of interactions with the mobile application matches one of the one or more content insertion parameters.

13. The system of claim 9, wherein the one or more processors is further configured to:
generate the content insertion policy; and
associate the content insertion policy with the mobile application.

14. The system of claim 13, wherein generating the content insertion policy includes:
identifying, for the mobile application, one or more goals;
determining, from historical usage of the mobile application across a plurality of computing devices, one or more sequences of interactions performed on the mobile application more than a threshold number of times; and
creating a rule to insert content after determining that any of the one or more determined sequences of interactions is performed on the mobile application.

15. The system of claim 14, wherein the one or more processors is further configured to:
determine a performance of the mobile application across a plurality of computing devices;
determine that the performance of the mobile application is below a threshold performance level; and
modify the content insertion policy to include additional content insertion opportunities.

16. The system of claim 9, wherein the one or more processors is further configured to:

receive an indication that the mobile application is launched on a computing device;

generate a session responsive to receiving an indication that the mobile application is launched;

identify, from the indicated plurality of interactions with the mobile application, one or more subsets of interactions;

determine that none of the one or more subsets of interactions matches a sequence of interactions identified in the content insertion policy; and determine to not insert content in response to determining that none of the one or more subsets of interactions matches a sequence of interactions identified in the content insertion policy.

17. A computer-readable storage medium having computer-executable instructions stored thereon, which when executed by a computer, cause the computer to:

identify a mobile application executing on a computing device within which to insert content;

generate a layout of a plurality of views of the mobile application, the layout comprising a plurality of identifications of transitions between the plurality of views and a corresponding interaction triggering each transition;

receive a plurality of indications of interactions with the mobile application executing on a computing device;

identify, via the transitions and corresponding interactions of the layout, a set of transitions of the mobile application from an initial view of the mobile application;

determine that the identified set of transitions from the initial view of the application corresponds to a content insertion policy for inserting third-party content to the mobile application; and transmit, to the mobile application, third-party content for display within the mobile application executing on the computing device responsive to the determination that the identified set of transitions corresponds to the content insertion policy.

18. The computer readable storage medium of claim 17, wherein the computer is further configured to:

identify a context associated with each of the interactions with the mobile application executing on the computing device, the context identifying a category of the view of the mobile application on which the corresponding interaction was performed and a type of action.

19. The method of claim 1, wherein the identified set of transitions of the mobile application comprises a plurality of transitions corresponding to a single content insertion policy for inserting third-party content to the mobile application.

20. The method of claim 1, wherein the identified set of transitions of the mobile application comprises transitions between views of distinct categories.

* * * * *